(12) United States Patent
Le et al.

(10) Patent No.: US 9,612,720 B2
(45) Date of Patent: Apr. 4, 2017

(54) AUTOMATIC PROCESSING WITH MULTI-SELECTION INTERFACE

(71) Applicant: Apollo Education Group, Inc., Phoenix, AZ (US)

(72) Inventors: David Le, San Jose, CA (US); Pradeep Ragothaman, Sunnyvale, CA (US); Shane Lunceford, San Jose, CA (US)

(73) Assignee: Apollo Education Group, Inc., Phoenix, AZ (US)

( * ) Notice: Subject to any disclaimer, the term of this patent is extended or adjusted under 35 U.S.C. 154(b) by 0 days.

(21) Appl. No.: 14/474,099

(22) Filed: Aug. 30, 2014

(65) Prior Publication Data

US 2016/0062560 A1   Mar. 3, 2016

(51) Int. Cl.
| | | |
|---|---|---|
| G06F 3/048 | (2013.01) | |
| G06F 17/30 | (2006.01) | |
| G06F 3/00 | (2006.01) | |
| G06F 3/0482 | (2013.01) | |
| G06F 3/0488 | (2013.01) | |

(Continued)

(52) U.S. Cl.
CPC .......... *G06F 3/0482* (2013.01); *G06F 3/0481* (2013.01); *G06F 3/0484* (2013.01); *G06F 3/04817* (2013.01); *G06F 3/04842* (2013.01); *G06F 3/04883* (2013.01); *G06F 11/3438* (2013.01); *G06F 17/30289* (2013.01); *G06F 17/30914* (2013.01); *H04L 67/10* (2013.01);
(Continued)

(58) Field of Classification Search
CPC .............. G06F 3/048; G06F 17/30; G06F 3/00
USPC ........................................................ 715/810
See application file for complete search history.

(56) References Cited

U.S. PATENT DOCUMENTS

| | | | |
|---|---|---|---|
| 2003/0001894 A1* | 1/2003 | Boykin et al. ................ 345/764 |
| 2004/0015400 A1* | 1/2004 | Whymark .............. G06Q 30/02 |
| | | | 705/14.42 |

(Continued)

OTHER PUBLICATIONS

Excel Document, http://office.microsoft.com/en-us/excel-help/basic-tasks-in-excel-2013-HA102813812.aspx, dated Aug. 2014, 2 pages.

(Continued)

*Primary Examiner* — Jennifer To
*Assistant Examiner* — Hugo Molina
(74) *Attorney, Agent, or Firm* — Hickman Palermo Becker Bingham LLP

(57) ABSTRACT

A multi-selection system allows selection of multiple displayed items in a GUI, and processes an underlying data set based on the selection. Users may utilize swipes or concurrent point interactions with the GUI to co-select items. The system identifies actions to perform for selected items based on selection criteria associated with the selected items, or mapping data that maps the selected items to actions. The system automatically identifies grouping criteria for data returned from performed actions and displays resulting groups for further user selection. The system provides suggestive visual highlights that identify commonly co-selected items in the interface. The system collects instrumentation items, for historical usage data, that record aspects of users' interactions with the system. As such, the system may identify, from the historical usage data, sets of commonly co-selected items, mappings between combinations of items and one or more actions, productive arrangements of items displayed in GUIs, etc.

32 Claims, 24 Drawing Sheets

(51) Int. Cl.
  *G06F 3/0484* (2013.01)
  *G06F 3/0481* (2013.01)
  *G06F 11/34* (2006.01)
  *H04L 29/08* (2006.01)

(52) U.S. Cl.
  CPC .......... *H04L 67/141* (2013.01); *H04L 67/306* (2013.01)

(56) References Cited

U.S. PATENT DOCUMENTS

| | | | |
|---|---|---|---|
| 2004/0117357 A1 | 6/2004 | Schirmer | |
| 2005/0203926 A1* | 9/2005 | Morita et al. | 707/100 |
| 2006/0156247 A1* | 7/2006 | McCormack et al. | 715/767 |
| 2007/0179642 A1* | 8/2007 | Detzler | G06Q 10/10 700/83 |
| 2009/0216794 A1* | 8/2009 | Saptharishi | G06F 17/30274 |
| 2009/0276722 A1* | 11/2009 | Segel | G06F 17/30029 715/765 |
| 2010/0031137 A1* | 2/2010 | Amaral | G06F 17/30893 715/234 |
| 2010/0070497 A1* | 3/2010 | Duplessis | G06F 17/30601 707/736 |
| 2011/0177482 A1 | 7/2011 | Katz | |
| 2011/0264645 A1* | 10/2011 | Mital et al. | 707/708 |
| 2012/0110071 A1 | 5/2012 | Zhou | |
| 2012/0185800 A1* | 7/2012 | Hart et al. | 715/810 |
| 2012/0203766 A1* | 8/2012 | Hornkvist | G06F 17/30112 707/722 |
| 2012/0256863 A1* | 10/2012 | Zhang | G06Q 10/10 345/173 |
| 2013/0024815 A1* | 1/2013 | O | H04M 1/72586 715/811 |
| 2013/0067377 A1* | 3/2013 | Rogers | G06F 3/04817 715/769 |
| 2013/0090915 A1 | 4/2013 | Clark | |
| 2013/0167055 A1* | 6/2013 | Penev et al. | 715/765 |
| 2013/0173593 A1* | 7/2013 | Nations | G06F 17/30864 707/722 |
| 2013/0227418 A1* | 8/2013 | Sa et al. | 715/728 |
| 2013/0227441 A1* | 8/2013 | Cockcroft | G06F 17/30873 715/760 |
| 2013/0227482 A1* | 8/2013 | Thorsander et al. | 715/821 |
| 2013/0246934 A1* | 9/2013 | Wade | G06Q 30/06 715/745 |
| 2014/0160131 A1* | 6/2014 | Azizi | G06T 11/206 345/440 |
| 2014/0331187 A1* | 11/2014 | Hicks | G06F 3/0488 715/845 |
| 2014/0351090 A1* | 11/2014 | Rana | G06Q 30/0625 705/26.62 |
| 2014/0380178 A1* | 12/2014 | Kapahi | G06F 3/0488 715/738 |
| 2015/0026642 A1* | 1/2015 | Wilson et al. | 715/825 |
| 2015/0143291 A1* | 5/2015 | Zha | G06F 3/04883 715/810 |
| 2016/0062562 A1 | 3/2016 | Ragothaman | |
| 2016/0062607 A1 | 3/2016 | Lunceford | |

OTHER PUBLICATIONS

Fruit Ninja, http://fruitninja.com/, 2 pages, dated Aug. 2014.
Wooga.com, Games, Jelly-Splash, http://www.wooga.com/games/jelly-splash/, dated Aug. 2014, 3 pages.

* cited by examiner

302 — MAINTAIN A DATABASE OF INFORMATION ITEMS, WHEREIN EACH INFORMATION ITEM IN THE DATABASE IS ASSOCIATED WITH METADATA

304 — A COMPUTING DEVICE DISPLAYS A PLURALITY OF SELECTABLE ITEMS IN A GRAPHICAL USER INTERFACE (GUI); WHEREIN EACH SELECTABLE ITEM OF THE PLURALITY OF SELECTABLE ITEMS REPRESENTS ONE OR MORE SELECTION CRITERIA

306 — THE COMPUTING DEVICE DETECTS AN INTERACTION WITH THE GUI THAT CO-SELECTS TWO OR MORE SELECTABLE ITEMS OF THE PLURALITY OF SELECTABLE ITEMS

308 — DETERMINE WHICH INFORMATION ITEMS IN THE DATABASE SATISFY THE SELECTION CRITERIA REPRESENTED BY AT LEAST ONE OF THE TWO OR MORE CO-SELECTED ITEMS

310 — ESTABLISH THE INFORMATION ITEMS IN THE DATABASE THAT SATISFY THE SELECTION CRITERIA REPRESENTED BY AT LEAST ONE OF THE TWO OR MORE CO-SELECTED ITEMS AS A FIRST SET OF INFORMATION ITEMS

312 — AFTER IDENTIFYING THE FIRST SET OF INFORMATION ITEMS, FORM A PLURALITY OF GROUPS FROM THE FIRST SET OF INFORMATION ITEMS; WHEREIN, FOR EACH GROUP OF THE PLURALITY OF GROUPS, ALL INFORMATION ITEMS IN THE GROUP HAVE AT LEAST ONE METADATA VALUE IN COMMON

314 — DISPLAY, IN THE GUI, A PLURALITY OF SUB-CATEGORY ITEMS; WHEREIN EACH SUB-CATEGORY ITEM REPRESENTS A CERTAIN GROUP OF THE PLURALITY OF GROUPS

A COMPUTING DEVICE DISPLAYS A PLURALITY OF ITEMS IN A GRAPHICAL USER INTERFACE

↓ 604

THE COMPUTING DEVICE DETECTS TWO OR MORE CONCURRENT POINT-STYLE INTERACTIONS, EACH OF WHICH TARGETS A RESPECTIVE TARGETED ITEM OF THE PLURALITY OF ITEMS DISPLAYED IN THE GRAPHICAL USER INTERFACE; WHEREIN AT LEAST TWO OF THE TWO OR MORE CONCURRENT POINT-STYLE INTERACTIONS TARGET AT LEAST TWO DISCONTIGUOUS ITEMS OF THE TARGETED ITEMS

↓ 606

IN RESPONSE TO DETECTING THE TWO OR MORE CONCURRENT POINT-STYLE INTERACTIONS, CAUSE SIMULTANEOUS SELECTION OF THE TARGETED ITEMS

↓ 608

WHILE THE TARGETED ITEMS ARE SELECTED, PERFORM ONE OR MORE ACTIONS BASED, AT LEAST IN PART, ON THE TARGETED ITEMS BEING SELECTED

702
A COMPUTING DEVICE DISPLAYS A PLURALITY OF ITEMS IN A GRAPHICAL USER INTERFACE

704
STORE A PLURALITY OF MAPPINGS, WHEREIN EACH MAPPING OF THE PLURALITY OF MAPPINGS MAPS A DISTINCT COMBINATION OF ITEMS, FROM THE PLURALITY OF ITEMS, TO A CORRESPONDING ACTION

706
THE COMPUTING DEVICE DETECTS AN INTERACTION WITH THE GRAPHICAL USER INTERFACE THAT CO-SELECTS TWO OR MORE ITEMS OF THE PLURALITY OF ITEMS

708
IN RESPONSE TO DETECTING THE INTERACTION, PERFORM THE STEPS OF: BASED ON THE PLURALITY OF MAPPINGS, IDENTIFYING A PARTICULAR ACTION THAT IS MAPPED TO A COMBINATION OF THE TWO OR MORE ITEMS; AND PERFORMING THE PARTICULAR ACTION

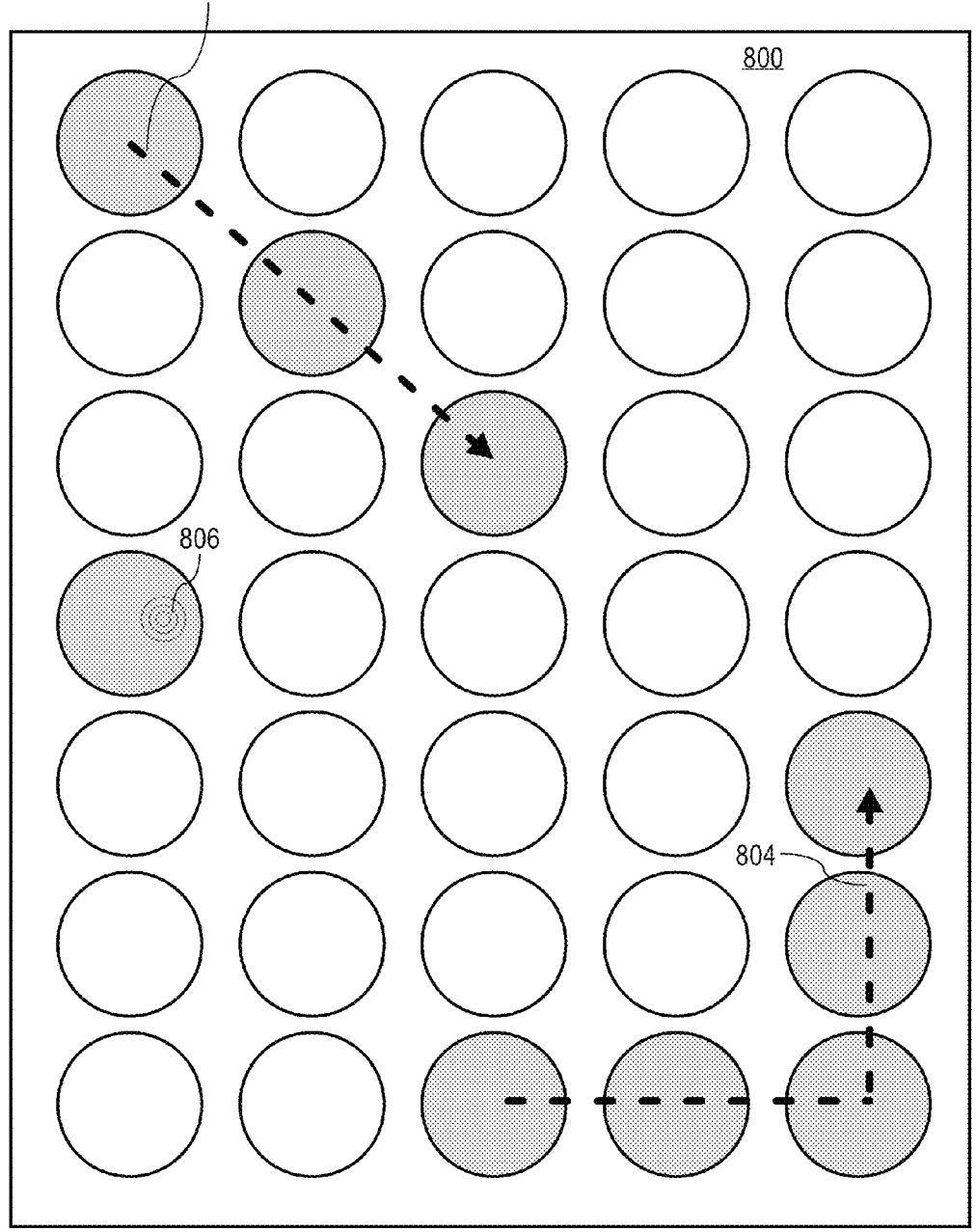

902 — SEND, TO A CLIENT, FIRST CONFIGURATION INFORMATION THAT DEFINES A FIRST CONFIGURATION OF A GRAPHICAL USER INTERFACE TO BE DISPLAYED AT THE CLIENT; WHEREIN, IN THE FIRST CONFIGURATION, THE GRAPHICAL USER INTERFACE DISPLAYS A PLURALITY OF ITEMS IN A FIRST ARRANGEMENT; WHEREIN THE PLURALITY OF ITEMS INCLUDES A FIRST ITEM AND A SECOND ITEM; AND WHEREIN, ACCORDING TO THE FIRST ARRANGEMENT, THE FIRST ITEM IS DISPLAYED DISCONTIGUOUS TO THE SECOND ITEM

904 — RECEIVE USAGE INFORMATION INDICATING THAT A USER CO-SELECTED BOTH THE FIRST ITEM AND THE SECOND ITEM

906 — BASED, AT LEAST IN PART, ON THE USAGE INFORMATION, DETERMINE THAT A SECOND ARRANGEMENT SHOULD BE USED FOR THE PLURALITY OF ITEMS IN THE GRAPHICAL USER INTERFACE; WHEREIN, ACCORDING TO THE SECOND ARRANGEMENT, THE FIRST ITEM IS DISPLAYED CONTIGUOUS TO THE SECOND ITEM

908 — SEND, TO A TARGET CLIENT, SECOND CONFIGURATION INFORMATION THAT DEFINES THE SECOND CONFIGURATION OF THE GRAPHICAL USER INTERFACE; WHEREIN, IN THE SECOND CONFIGURATION, THE GRAPHICAL USER INTERFACE DISPLAYS THE PLURALITY OF ITEMS IN THE SECOND ARRANGEMENT

AUTOMATIC PROCESSING WITH MULTI-SELECTION INTERFACE

FIELD OF THE INVENTION

The present invention relates to efficient processing of data based on intelligent multi-selection of graphical user interface items.

BACKGROUND

Graphical user interfaces (GUIs) allow software providers to communicate with a user efficiently and attractively, and to provide mechanisms by which a user can easily provide a software system with information. Many times, a GUI displays multiple items (such as multiple pieces of data) and allows a user to select one or more of the displayed items.

A GUI that allows a user to select multiple items may provide the user with controls to select each desired item individually, e.g., with checkbox controls, toggle controls, controls that allow the user to drill down through a hierarchy of items, etc. Some GUIs also provide a user with a "select all" option, which automatically causes all selectable items to be simultaneously selected. However, it can be time consuming for a user to sequentially select only desired items, especially if the user wants to select some available items, but not all of them.

GUIs that present items for selection in a list control generally allow the user to select multiple items using shift-click (to co-select all items between the previously selected item and the item that is the target of the shift-click, inclusive of the end items) and using ctrl-click (to add the subject of the ctrl-click to the set of currently selected items). However, it can be tedious to select non-contiguous items in a list control.

Furthermore, GUIs that present multiple selectable items via a grid control generally allow a user to select all items in a particular row, or column, and to swipe across cells in the grid to select multiple grid cells in a block. Such a swipe selects all cells in the grid that are in columns that intervene between the start column and end column of the swipe (inclusive of the start and end columns) and that are in rows that intervene between the start row and end row of the swipe (inclusive of the start and end rows). As with a list, a user may select and de-select particular items using ctrl-click. It can be tedious to select non-contiguous desired items, or to select desired items that are not all in a single row, column, or block of cells in a grid control.

Thus, it would be beneficial to provide a method to improve selection of multiple displayed items in a GUI and provide functionality connected with multiple selected items.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 depicts a flowchart for using multi-selection of GUI items to drill down through categories of items.

FIG. 6 depicts a flowchart for selecting multiple items via multiple concurrent point-style interactions with a graphical user interface.

FIG. 7 depicts a flowchart for identifying a particular action mapped to a combination of items that are co-selected in a GUI.

FIG. 8 depicts a GUI with a grid of displayed items.

FIG. 9 depicts a flowchart for adjusting the configuration of a graphical user interface based on historical usage data.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

A multi-selection system is described hereafter which allows selection of multiple displayed items in a GUI, and processing of an underlying data set based on this selection. Using the co-selection techniques described herein, users may quickly and efficiently communicate commands in the interface. Users may utilize swipe- or concurrent point-style interactions with the GUI to quickly co-select multiple items.

In one embodiment, the system automatically identifies actions to perform for the selected items based on selection criteria associated with the selected items, or mapping data that maps a combination of the selected items to one or more actions. Actions performed on the underlying data set may act as a query that returns query results. The system automatically identifies grouping criteria for data returned in query results and displays items representing the resulting groups for further user selection.

To aid a user in determining which items to co-select, the system provides suggestive visual highlights. Such highlights may be provided in response to activation of a help button, or in response to the user initiating selection of items. Suggestive visual highlights identify, for the user, commonly co-selected items in the interface.

Information needed to perform the functions of the multi-selection system is derived from historical usage data. The system collects instrumentation items, for the historical usage data, that record aspects of users' interactions with the system. As such, the system may identify, from the historical usage data gathered for the particular user interacting with the system or for users that are similar to the particular user, sets of commonly co-selected items, mappings between combinations of items and one or more actions, productive arrangements of items displayed in GUIs, etc.

Multi-Selection Graphical User Interface Architecture

Figure 1:
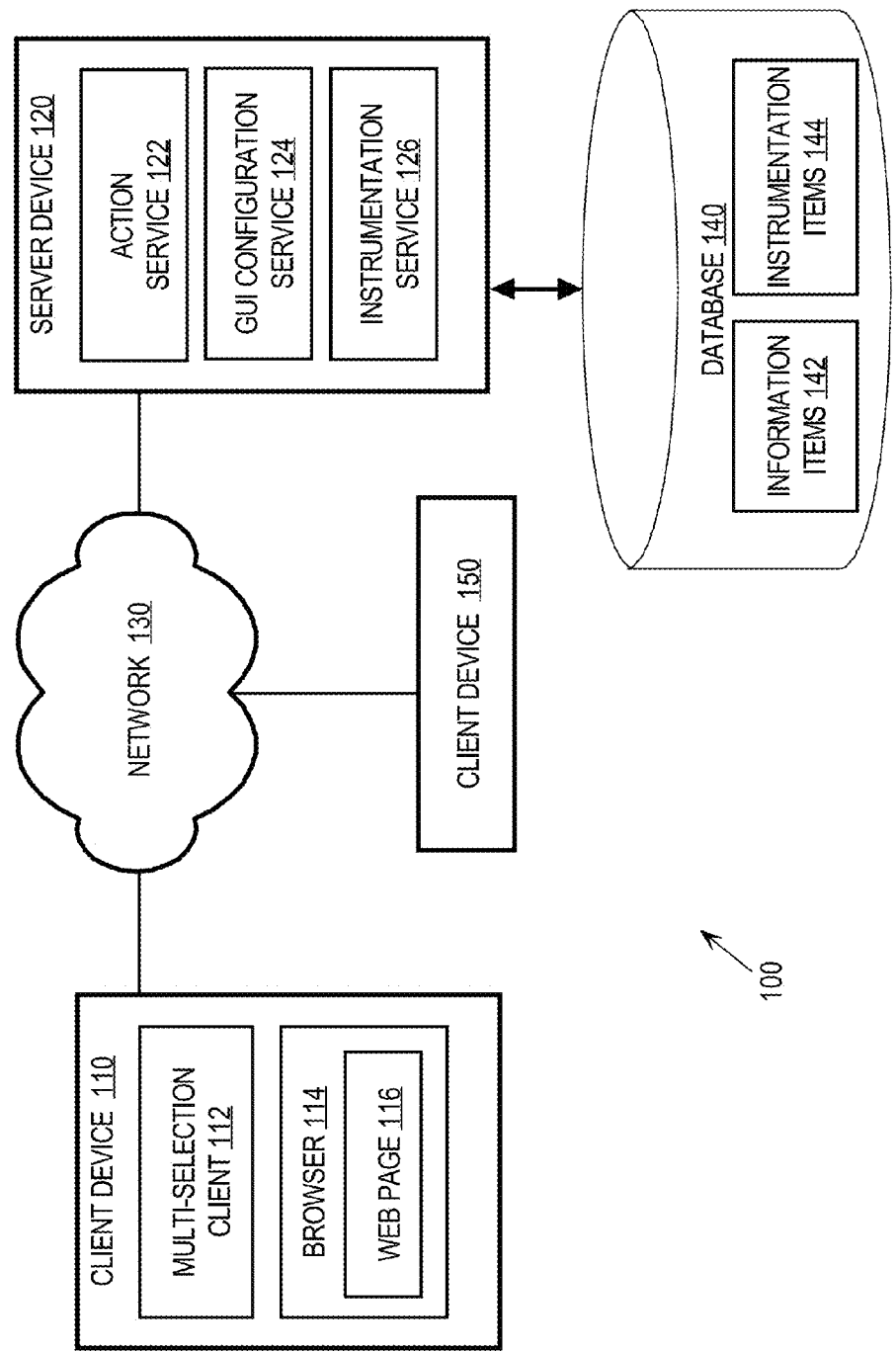
FIG. 1 is a block diagram that depicts an example network arrangement for allowing selection and processing of multiple co-selected items in a graphical user interface.

Techniques are described hereafter for allowing selection and processing of multiple co-selected items in a graphical user interface. FIG. 1 is a block diagram that depicts an example network arrangement 100 for providing such a multi-selection graphical user interface, according to embodiments. Network arrangement 100 includes a client device 110, a client device 150, and a server device 120 communicatively coupled via a network 130. Server device 120 is also communicatively coupled to a database 140. Example network arrangement 100 may include other devices, including client devices, server devices, and display devices, according to embodiments. For example, one or more of the services attributed to server device 120 herein may run on other server devices that are communicatively coupled to network 130.

Client devices 110 and 150 may be implemented by any type of computing device that is communicatively connected to network 130. Example implementations of client devices 110 and 150 include, without limitation, workstations, personal computers, laptop computers, personal digital assistants (PDAs), tablet computers, cellular telephony devices such as smart phones, video game consoles, and any other type of computing device. Client device 110 and client device 150 need not, but may, be implemented similarly within embodiments.

In network arrangement 100, client device 110 is configured with a multi-selection client 112 and a browser 114 that displays a web page 116. Client device 110 may be configured with other mechanisms, processes and functionalities, depending upon a particular implementation.

Multi-selection client 112 may be implemented in any number of ways, including as a plug-in to browser 114, as an application running in connection with web page 116, as a stand-alone application running on client device 110, etc. Multi-selection client 112 may be implemented by one or more logical modules, and is described in further detail below. Browser 114 is configured to interpret and display web pages that are received over network 130 (e.g., web page 116), such as Hyper Text Markup Language (HTML) pages, and eXtensible Markup Language (XML) pages, etc.

Further, client device 110 is communicatively coupled to a display device (not shown in FIG. 1), for displaying graphical user interfaces, such as graphical user interfaces of web page 116. Such a display device may be implemented by any type of device capable of displaying a graphical user interface. Example implementations of a display device include a monitor, a screen, a touch screen, a projector, a light display, a display of a tablet computer, a display of a telephony device, a television, etc.

To illustrate display of a particular GUI, multi-selection client 112 on client device 110 receives information for a web page 116, which includes a particular GUI (such as any GUI described herein), from GUI configuration service 124 of server device 120. Browser 114 of client device 110 interprets the information for web page 116 and displays, via a display device, the particular GUI.

According to an embodiment, client device 150 is configured with a multi-selection client and a browser that perform functions similar to the functions performed by multi-selection client 112 and browser 114 of client device 110, as described herein.

Network 130 may be implemented with any type of medium and/or mechanism that facilitates the exchange of information between client device 110, client device 150, and server device 120. Furthermore, network 130 may facilitate use of any type of communications protocol, and may be secured or unsecured, depending upon the requirements of a particular embodiment.

Server device 120 may be implemented by any type of computing device that is capable of communicating with a client device over network 130. In network arrangement 100, server device 120 is configured with an action service 122, a GUI configuration service 124, and an instrumentation service 126. One or more of services 122-126 may be part of a cloud computing service. Services 122-126 may be implemented by one or more logical modules, and are described in further detail below. Server device 120 may be configured with other mechanisms, processes and functionalities, depending upon a particular implementation.

Server device 120 is communicatively coupled to database 140. Database 140 maintains at least two bodies of data: information items 142, and instrumentation items 144. Database 140 may reside in any type of storage, including volatile and non-volatile storage (e.g., random access memory (RAM), a removable or disk drive, main memory, etc.), and may be implemented by one or more logical databases. The storage on which database 140 resides may be external or internal to server device 120.

Any of multi-selection client 112 and services 122-126 may receive and respond to Application Programming Interface (API) calls, Simple Object Access Protocol (SOAP) messages, requests via HyperText Transfer Protocol (HTTP), HyperText Transfer Protocol Secure (HTTPS), Simple Mail Transfer Protocol (SMTP), or any other kind of communication, e.g., from one of the other services 122-126 or multi-selection client 112. Further, any of Multi-selection client 112 and services 122-126 may send one or more such communications over network 130, e.g., to one of the other entities of the system.

Functionality attributed to one or more of services 122-126 and multi-selection client 112 may be performed by a different service/client, such as another of services 122-126 or multi-selection client 112, according to embodiments. In an embodiment, each of the processes described in connection with one or more of multi-selection client 112 and services 122-126 are performed automatically and may be implemented using one or more computer programs, other software elements, and/or digital logic in any of a general-purpose computer or a special-purpose computer, while performing data retrieval, transformation, and storage operations that involve interacting with and transforming the physical state of memory of the computer.

Interacting with a Graphical User Interface

Figure 2:
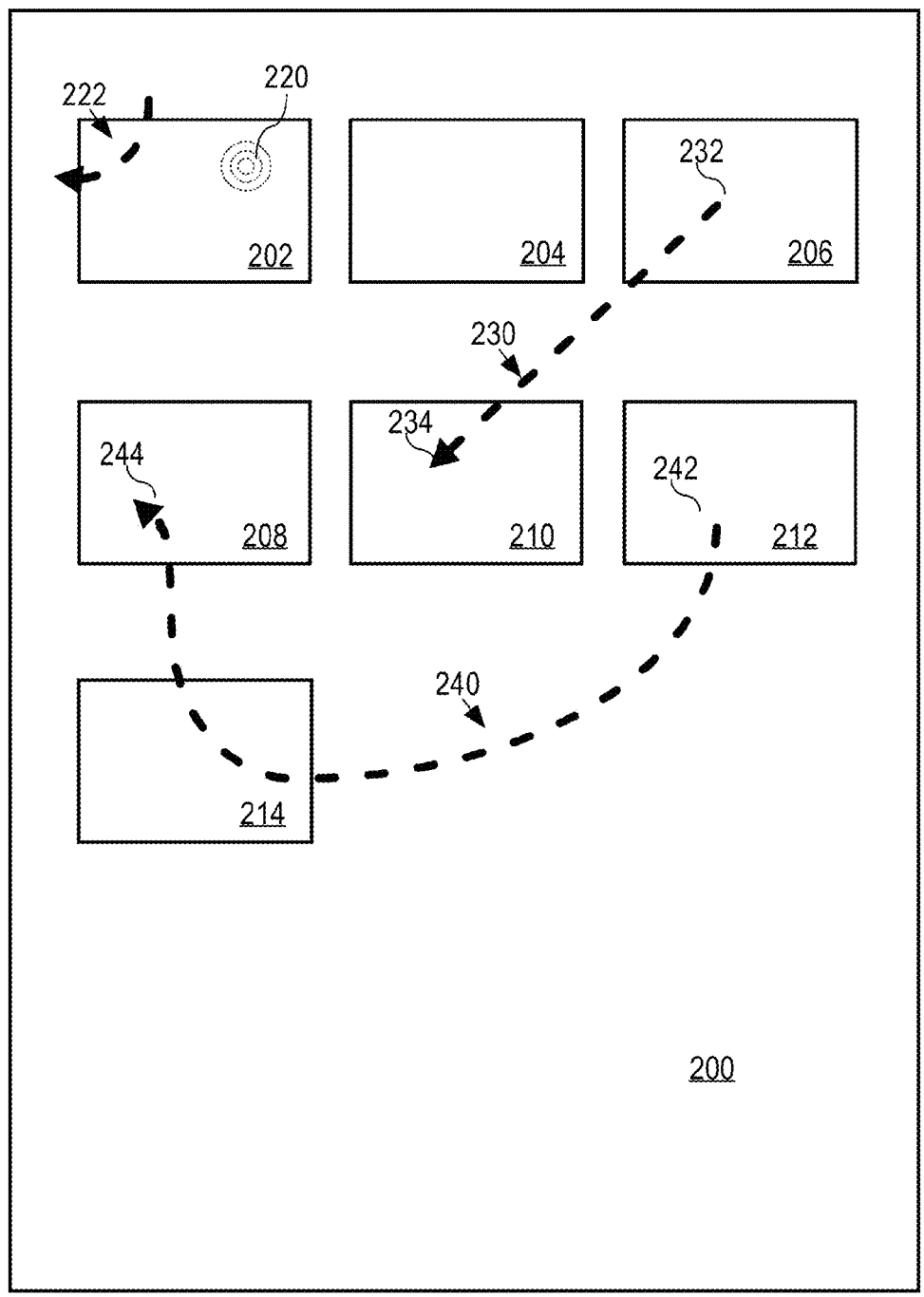
FIG. 2 depicts interactions with a GUI displaying multiple items.

Users may interact with a GUI that displays multiple items in various ways. To illustrate, FIG. 2 depicts interactions with a GUI 200 that displays multiple items 202-214. A distinct portion of GUI 200 is dedicated to each displayed item 202-214 such that a user may select a particular item by performing an action that targets the portion of the GUI dedicated to that particular item. As used herein, an "interaction event" is an event that causes a GUI to register an interaction, such as a touch on a touch screen, or a gesture that registers with a motion detector, etc. Point-style interactions and swipe-style interactions are two common types of interaction events.

Point-Style Interactions

In the example of GUI 200, multi-selection client 112 detects a point-style interaction (or "point") 220 that targets item 202. Typically, a point-style interaction targets a displayed item when at least a majority of the surface area of the point-style interaction overlaps with the GUI area dedicated to depiction of the displayed item. According to an embodiment, a point-style interaction targets a particular point or relatively small portion of a GUI. Examples of a relatively small portion of a GUI is a portion of the GUI that is as small as or smaller than: a portion of the interface dedicated to a particular displayed item; the width of a displayed item; the height of a displayed item; a certain threshold size either set by an administrator or by the user; etc.

According to one embodiment, a point-style interaction targets only a single item, no matter what the shape of the interaction. In this embodiment, point 222 is considered a point-style interaction because point 222 only targets a single item in GUI 200 (i.e., item 202).

Swipe-Style Interactions

In the example of GUI 200, multi-selection client 112 also detects a swipe-style interaction 230. A swipe-style interaction (or "swipe") is an interaction that swipes across at least two items in a GUI, i.e., in a single stroke. A swipe-style interaction may be enacted by touching a touch-enabled display at a start point (i.e., start point 232), moving the touch interaction along a path over the GUI that intersects with portions of the GUI that depict the desired items, and ending the touch interaction once all desired items have been swiped over (i.e., at end point 234). In this example, swipe 230 targets items 206 and 210 because the path of swipe 230 intersects items 206 and 210. Because a swipe-style interaction swipes across multiple items, a swipe (such as swipe 230) has a start point (i.e., start point 232) and an end point (i.e., end point 234).

A swipe need not have a path that is a straight line, but may have a path that includes one or more changes of direction, such as swipe 240. Swipe 240 targets items 212, 214, and 208. Swipes target items in a particular order, given the path of the swipe. For example, swipe 240 targets items 212, 214, and 208 in that order given the positions of start point 242 and end point 244 of swipe 240.

Detecting Interaction Events

Interactions with a GUI may be detected by multi-selection client 112 via a touch screen. Such interactions may be performed with one or more objects that touch the screen. Typical objects used to touch the screen include a single finger, multiple fingers, a single stylus, etc. Multi-selection client 112 may also detect interactions with a GUI via one or more non-touch input sources including but not limited to: a body motion sensor, a voice recognizer, a camera, an eye motion detector, a virtual reality interface device, a stylus or magnet motion detector, a mouse, etc. A non-touch input source, such as a motion sensor, may be calibrated to identify hand or finger motions that perform the swipe and point-style interactions described herein. Each Interaction event has a start time, a shape (or surface area), a location, a path with a start-point and end-point (which may be the same location in the case of a point-style interaction), and a stop time.

According to embodiments, swipes described herein and depicted in the accompanying figures may be enacted by multiple point-style interactions that respectively target each of the multiple items targeted by the described swipe.

Multi-Selection of Information Category Items to Display Dynamic Sub-Category Items Multi-selection of GUI items can be used to manipulate data in an underlying database. Such functionality can be useful to allow a user to dynamically and quickly parse through large information stores using a simple interface. FIG. 3 depicts a flowchart 300 for using multi-selection of GUI items to drill down through categories of items. Flowcharts herein depict example embodiments, and do not limit the scope of the invention. For example, features described in connection with a particular flowchart may be used in combination with features described in connection with one or more other flowcharts.

At step 302, a database of information items is maintained, wherein each information item in the database is associated with metadata. For example, action service 122 maintains, in database 140, a database of information items 142 for a particular institution of learning. In this example, information items 142 include one or more of: syllabus data; activity, grade, roster, and announcement data for one or more school classes; private messages sent to and drafted for a particular mailbox; drafts of other documents submitted to the system (such as in connection with one or more of the school classes), etc.

Information items 142 are associated with metadata. For example, a particular piece of information in information items 142 is a message. The message comprises text, a subject line, and a source and destination. The message is also associated with other information, such as one or more of: an identifier of a user that authored the message; a date and time the message was authored, or sent; a course identifier for a course that the message relates to; etc. Any piece of information associated with an information item may be considered metadata of the item.

Each of information items 142 is associated with a type of item, such as a syllabus-type item, a message-type item, a grade-type item, a course-type item, etc. An information item may be associated with one or more child-items, which are information items that contain information germane to the parent information item. An information item is directly associated with metadata of the information item, and is indirectly associated with metadata of one or more items that relate to the item, e.g., the item's parent, the item's siblings (children of the item's parent).

Figure 4A:
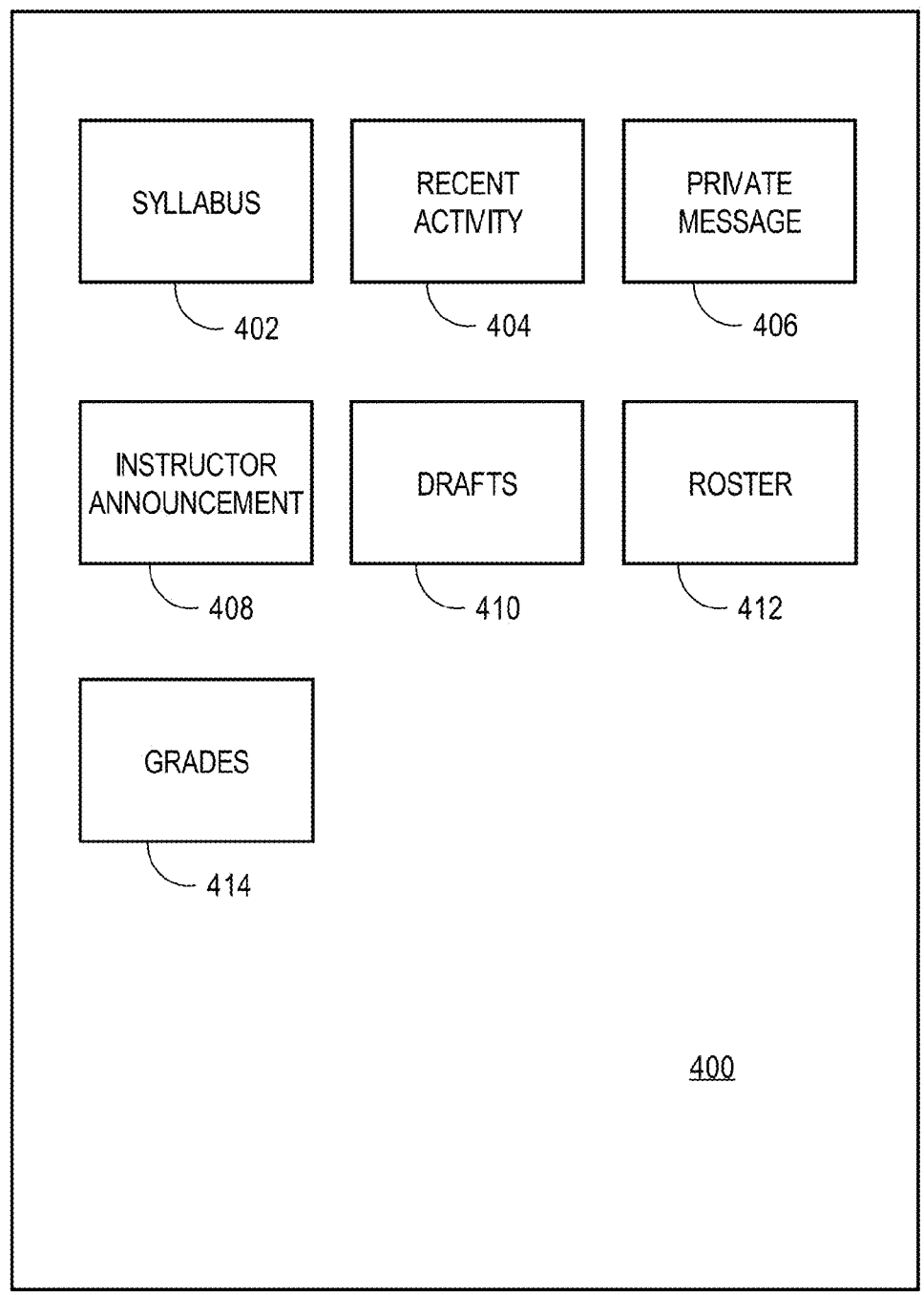
FIGS. 4A-G depict interactions with GUIs displaying multiple items.

At step 304 of flowchart 300, a computing device displays a plurality of selectable items in a graphical user interface (GUI), wherein each selectable item of the plurality of selectable items represents one or more selection criteria. For example, multi-selection client 112 receives information for GUI 400 of FIG. 4A, and causes client device 110 to display GUI 400 at a display device. GUI 400 includes selectable items 402-414.

Each of selectable items 402-414 is associated with one or more selection criteria. Items that are associated with one or more selection criteria are referred to herein as "selection criteria items". To illustrate selection criteria for GUI 400, the following shows mappings of items in GUI 400 to corresponding selection criteria, which mappings may be stored in database 140:

"Syllabus" item 402: select information items that are either syllabus-type information items, or child-items of one or more syllabus-type information items;

"Recent Activity" item 404: select information items that are directly or indirectly associated with a timestamp (e.g., created, modified, accessed) that is within a certain amount of time (e.g., a certain number of minutes, hours, days, etc.) from the present time;

"Roster" item 412: select information items that are either roster-type information items, or child-items of one or more roster-type information items;

"Grades" item 414: select information items that are grade-type items.

Furthermore, in one embodiment, each selection criteria item in GUI 400 is also implicitly associated with the selection criteria, which select information items that are either directly or indirectly related to the user that is interacting with the GUI. In this example, multi-selection client 112 has information about the user using multi-selection client 112 based on user authentication information and/or user profile data identified from the authentication information.

Figure 4B:
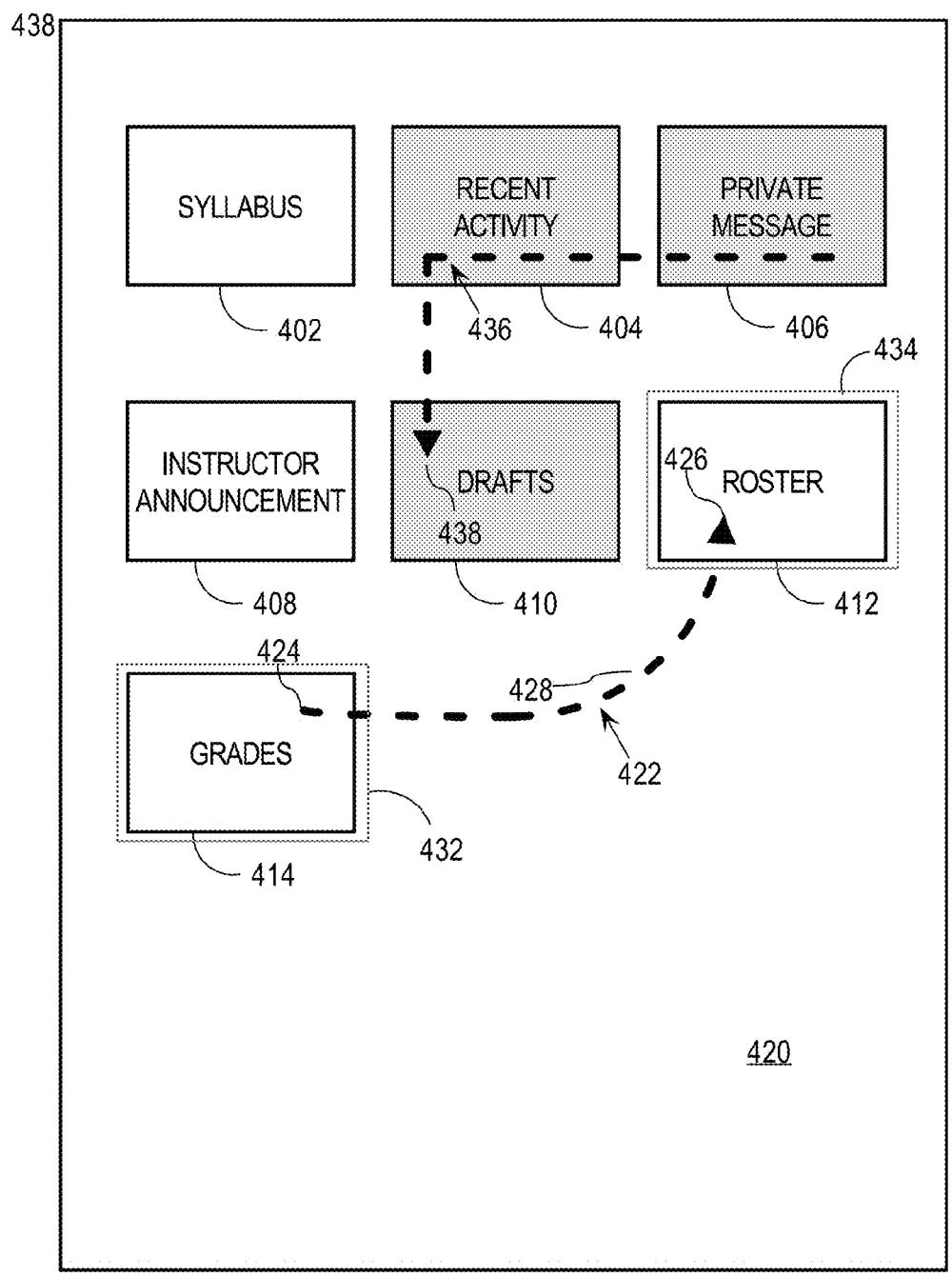

At step 306, the computing device detects an interaction with the GUI that co-selects two or more selectable items of the plurality of selectable items. For example, multi-selection client 112 of client device 110 detects swipe 422 depicted in GUI 420 of FIG. 4B. Swipe 422 targets selection criteria items 414 and 412, which are therefore co-selected by swipe 422. Co-selection of items is selection of the items during the same interaction of a user with a GUI, i.e., as a group. Co-selection is an indication, from the user, that the user wishes the items to be jointly processed or processed similarly. Multi-selection client 112 sends information indicating co-selection of selection criteria items 414 and 412 to action service 122.

Multi-selection client 112 may visually highlight selected items, e.g., by visual highlights 432 and 434 depicted in GUI 420, or by any other means including by shading the representation of a selected item a different color than the non-selected items. No other items are selected (i.e., selection criteria items 402-410 remain unselected) because no other selection criteria items were intersected by swipe 422.

According to an embodiment, steps 308-314 are performed in response to detecting the interaction with the GUI at step 306. In an embodiment, one or more of steps 308-314 are performed before completion of the interaction with the GUI is detected, or in other words, while the interaction is being detected. Instead of or in addition to performing some steps while the interaction is being detected, some steps may be performed after or in response to completion of the interaction. Thus, in an embodiment, one or more of steps 308-314 are performed after, or in response to, detecting completion of the interaction with the GUI.

Identifying Information Items that Satisfy Selected Criteria

At step 308, it is determined which information items in the database satisfy the selection criteria represented by at least one of the two or more co-selected selection criteria items. For example, action service 122 identifies, in information items 142, information items that satisfy the selection criteria of one or more of selection criteria items 412 and 414. In the present example, selection criteria item 412 corresponds to "select information items that are either roster-type information items, or child-items of one or more roster-type information items" and selection criteria item 414 corresponds to "select information items are grade-type items". Thus, at step 308 it is determined which information items are "either roster-type information items, or child-items of one or more roster-type information items" or "grade-type items".

According to an embodiment, action service 122 also identifies information items that satisfy the selection criteria of all of the selected selection criteria items (i.e., both selection criteria items 412 and 414). In the present example, the information items that satisfy the selection criteria of selection criteria item 412 and the selection criteria item 414 are those information items that are both "either roster-type information items, or child-items of one or more roster-type information items" and "grade-type items".

According to another embodiment, action service 122 first attempts to identify information items that satisfy the selection criteria of all of the selected selection criteria items. Then, if there are no information items satisfy the selection criteria for all of the selected criteria items, the action service 122 identifies information items, in information items 142, that satisfy the selection criteria of at least one of the selected selection criteria items.

In an example where a user co-selects item 414 "Grades" with item 404 "Recent Activity", there would likely be information items that satisfy selection criteria for both selected items. In an embodiment, in response to determining that there are information items that satisfy selection criteria for all selected selection criteria items, action service 122 identifies those information items that satisfy selection criteria for all co-selected selection criteria items rather than just information items that satisfy selection criteria for at least one of the co-selected selection criteria items.

At step 310, the information items in the database that satisfy the selection criteria represented by at least one of the two or more co-selected selection criteria items are established as a first set of information items. For example, action service 122 establishes the set of information items that satisfy at least one of the criteria for the co-selected selection criteria items 412 and 414 as a first set of information items.

Forming Subgroups

At step 312, after identifying the first set of information items, a plurality of groups from the first set of information items are formed, wherein, for each group of the plurality of groups, all information items in the group have at least one metadata value for at least one metadata attribute in common. For example, one group may all share the same creation date, another group may share the same author, etc. As a further example, the groups are organized based on metadata values for a particular metadata attribute, such as an associated semester. In this example, items in one group are all associated with the semester "fall 2012", items in another group are all associated with the semester "spring 2013", etc.

According to embodiments, action service 122 dynamically identifies metadata for information items in the first set that may be used to group the information items. Administrators may provide action service 122 a list of types of metadata that are preferable to be used as grouping criteria. Further, action service 122 may automatically determine metadata upon which to form groups based on the number of groups that particular metadata would create. For example, action service 122 may be configured to automatically determine and use metadata that would result in the lowest number of groups. Identification of grouping metadata may be based on any number of factors.

As an example of grouping the first set of information items, action service 122 determines that all of the information items in the first set relate to courses that the requesting user took during particular semesters. Action service 122 groups the information items into groups based on common semesters, such as "Fall 2012", "Spring 2013", etc., based on a determination that grouping based on semesters results in a number of groups that is less than a threshold value. All information items in a particular group pertain to the same semester. In other examples, action service 122 groups the information items in the first set by one or more of: type of related course, professor teaching the various related courses, a size of the related course, etc.

Figure 4C:
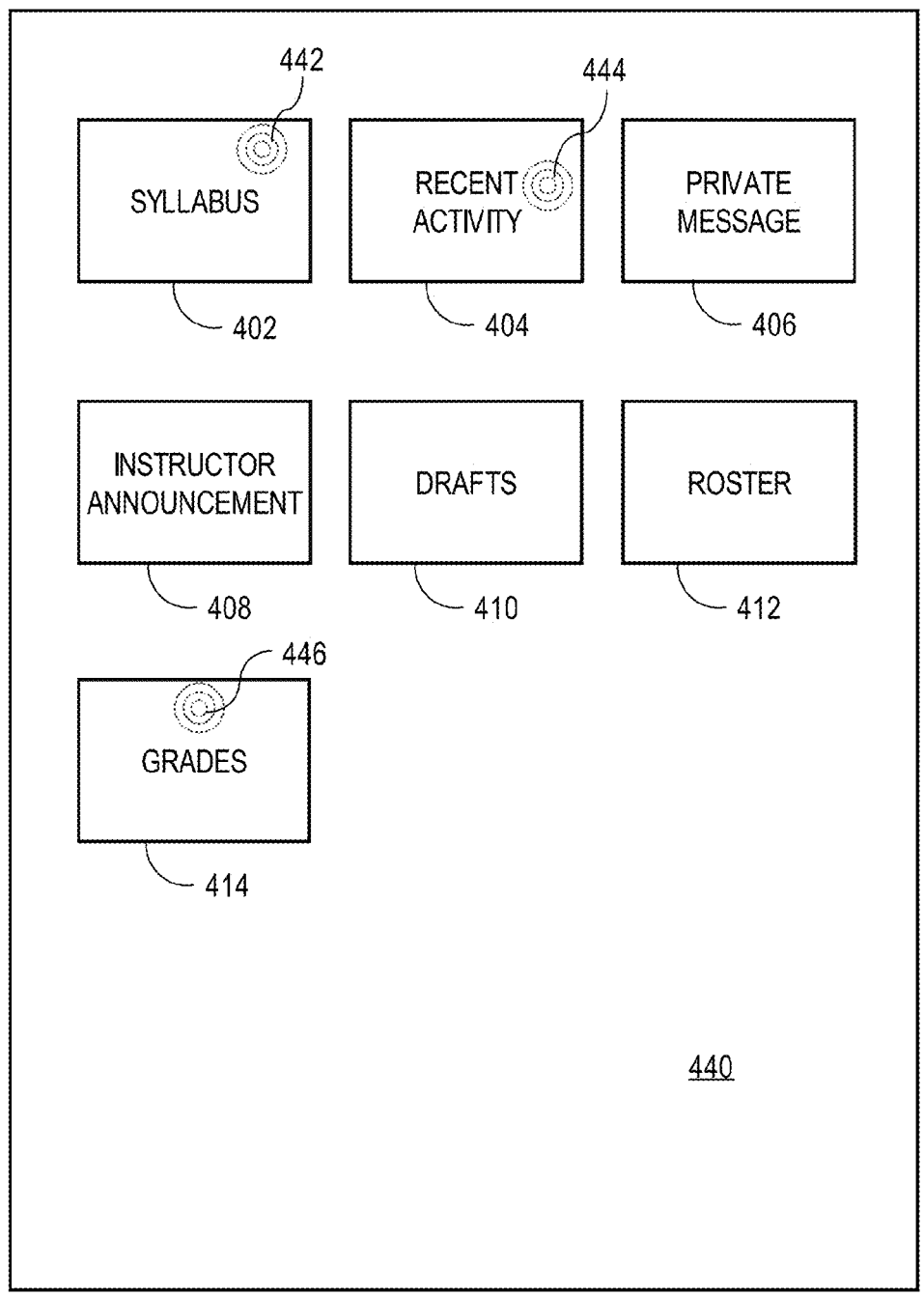
Figure 4D:
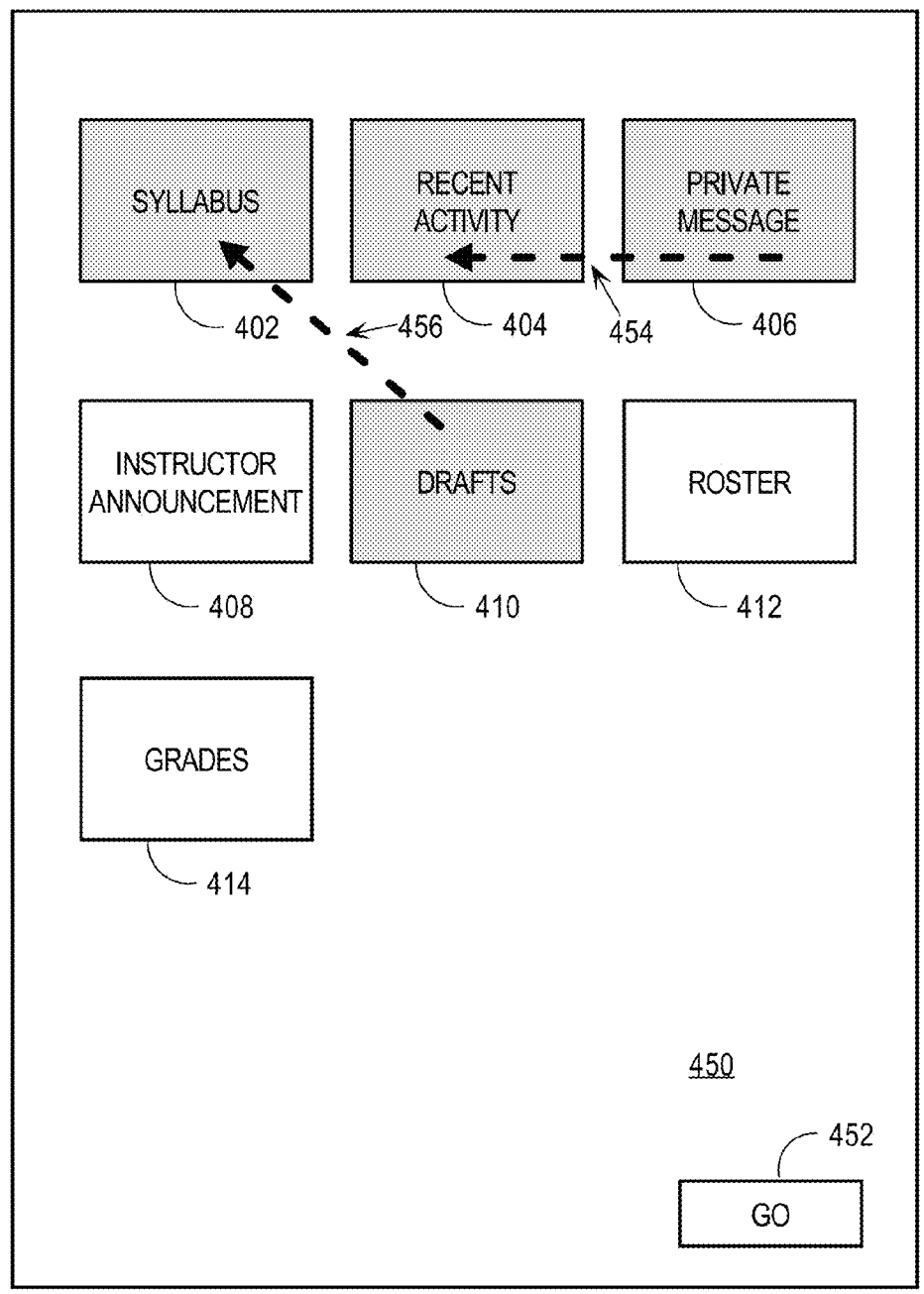
Figure 4E:
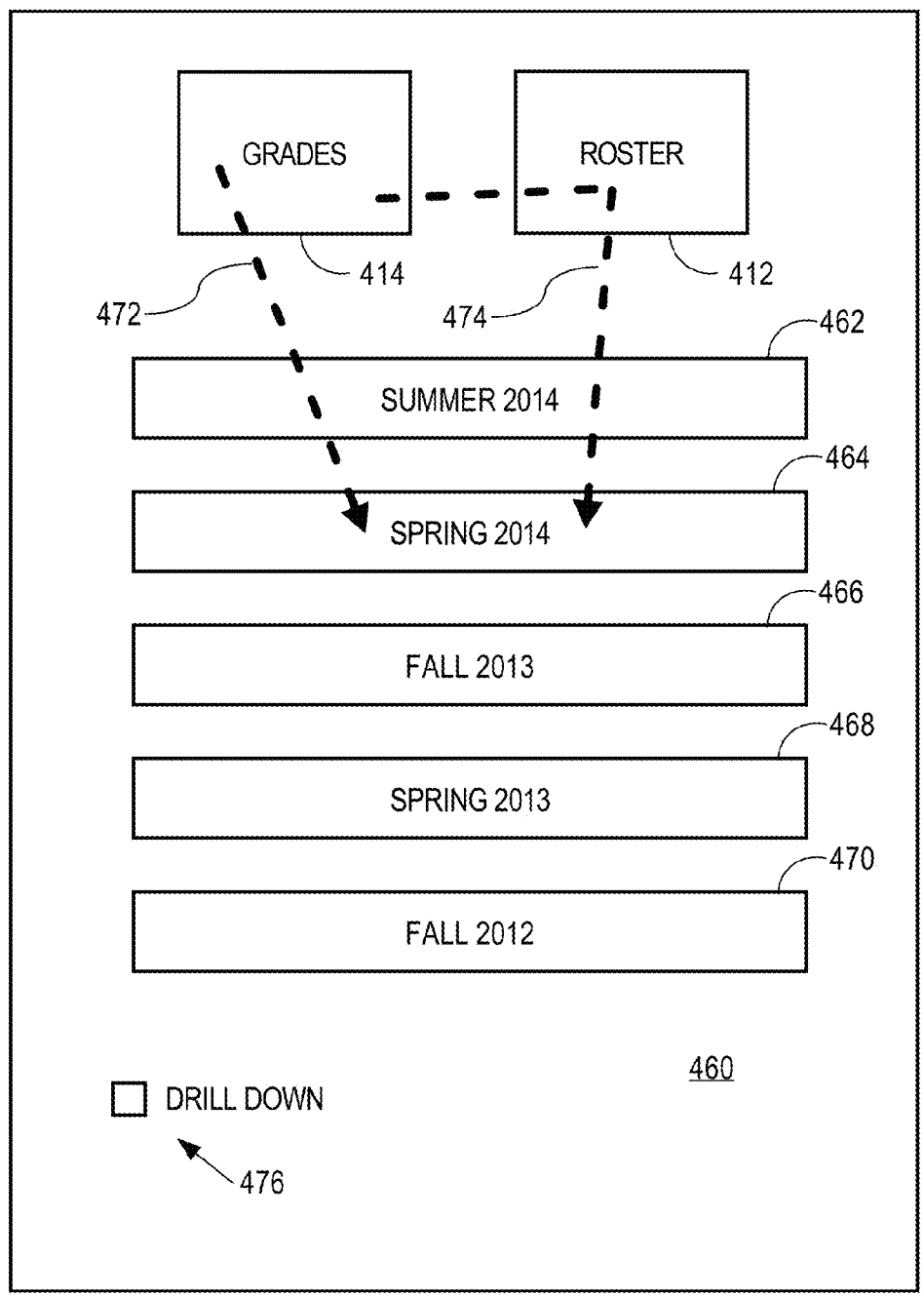

At step 314, a plurality of sub-category items are displayed in the GUI, wherein each sub-category item represents a certain group of the plurality of groups. For example, action service 122 provides the information about the groupings to GUI configuration service 124, which causes multi-selection client 112 to display a GUI (such as GUI 460 of FIG. 4E) with items that represent each group identified by action service 122, respectively.

GUI 460 displays items 462-470 that correspond to each group identified by action service 122, respectively. Items 462-470 are labeled with the metadata that each group has in common, i.e., semesters that the user has enrolled in courses that are associated with grades or roster data in the first set of information items. In the embodiment of GUI 460, multi-selection client 112 also displays items 414 and 412, which allows the user to identify whether the user wishes to see information items, from selected semesters, that satisfy selection criteria for the "grades" item 414 and for the "roster" item 412 or information items that satisfy selection criteria for only one of the selection criteria items 412 and 414.

To illustrate usage of GUI 460, swipe 472 swipes over selection criteria items 414, 462, and 464, which indicates to multi-selection client 112 that the user wishes to see only "grades" data for semesters "summer 2014", and "spring 2014". Swipe 474 swipes over selection criteria items 412, 414, 462, and 464, which indicates to multi-selection client 112 that the user wishes to see "grades" and "roster" data for semesters "summer 2014", and "spring 2014".

According to an embodiment in which drill down checkbox 476 is included in GUI 460, in response to detecting swipe 474, multi-selection client 112 determines whether drill down checkbox 476 is selected. In response to determining that drill down checkbox 476 is not selected, multi-selection client 112 displays all roster and grades data for the indicated semesters.

However, if multi-selection client 112 determines that drill down checkbox 476 is selected (and in embodiments that do not include a control such as drill down checkbox 476), action service 122 identifies all roster and grades data for the indicated semesters as information items in a second set. Action service 122 determines whether there is metadata that, if made the basis of grouping the second set, would result in less than a threshold number of groups.

For example, action service 122 determines that the information items in the second set may be grouped based on course identifiers. Action service 122 communicates, to GUI configuration service 124, the identified groupings for the second set of information items. As such, GUI configuration service 124 causes multi-selection client 112 to display GUI 480 of FIG. 4F, which displays items that represent courses associated with roster and grades data from the semesters that were co-selected in GUI 460.

Figure 4F:
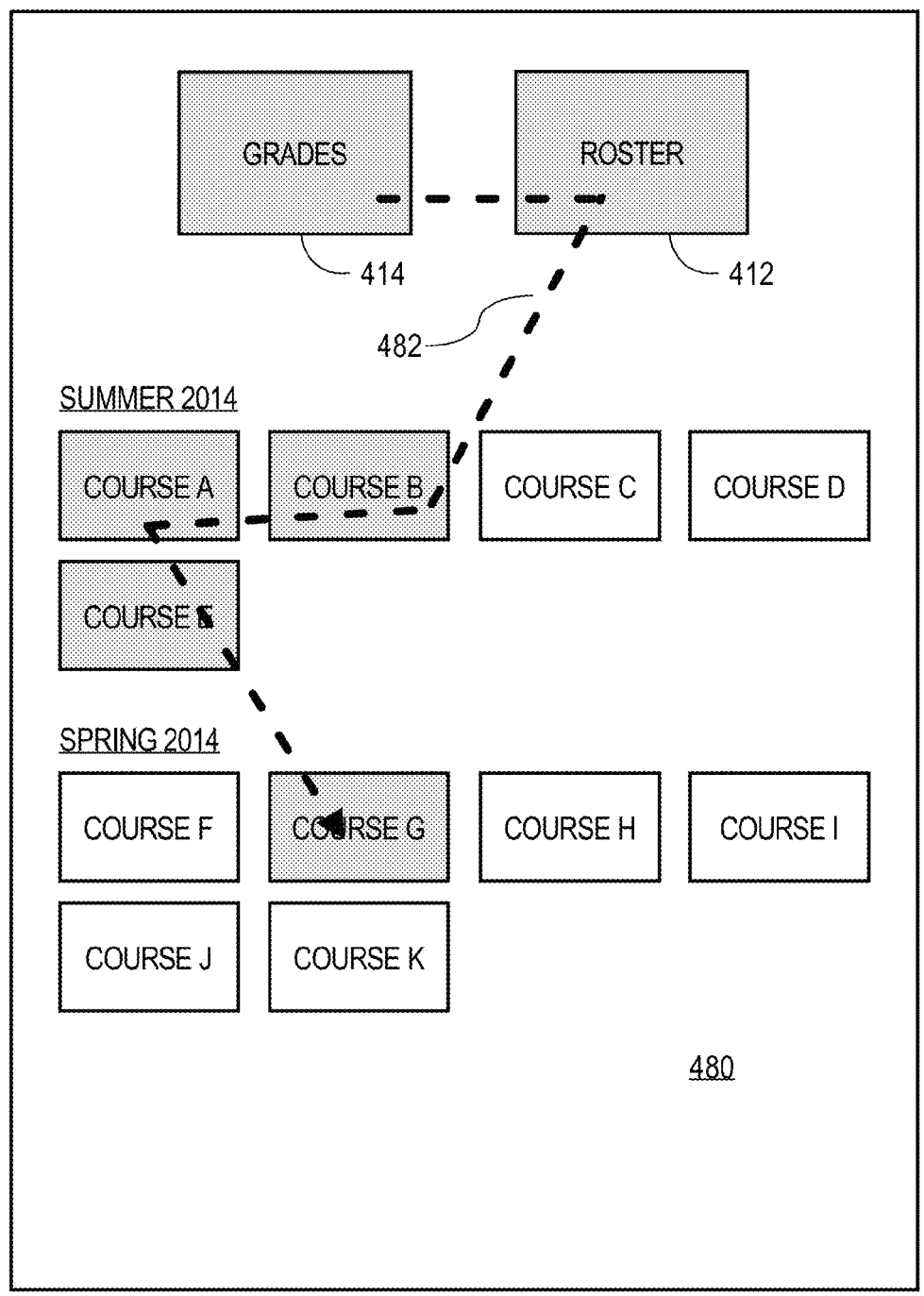

In the example of FIG. 4F, the user performs swipe 482, which selects items 414 and 412, as well as particular of the displayed course items (i.e., courses A, B, E, and G). In response to detecting swipe 482, action service 122 identifies those information items from the second set that satisfy selection criteria for the co-selected items displayed in GUI 480, i.e., information items that are grades or roster data from courses A, B, E, and G. Multi-selection client 112 does not display information items for any semesters or classes that were not selected by the user.

Figure 4G:
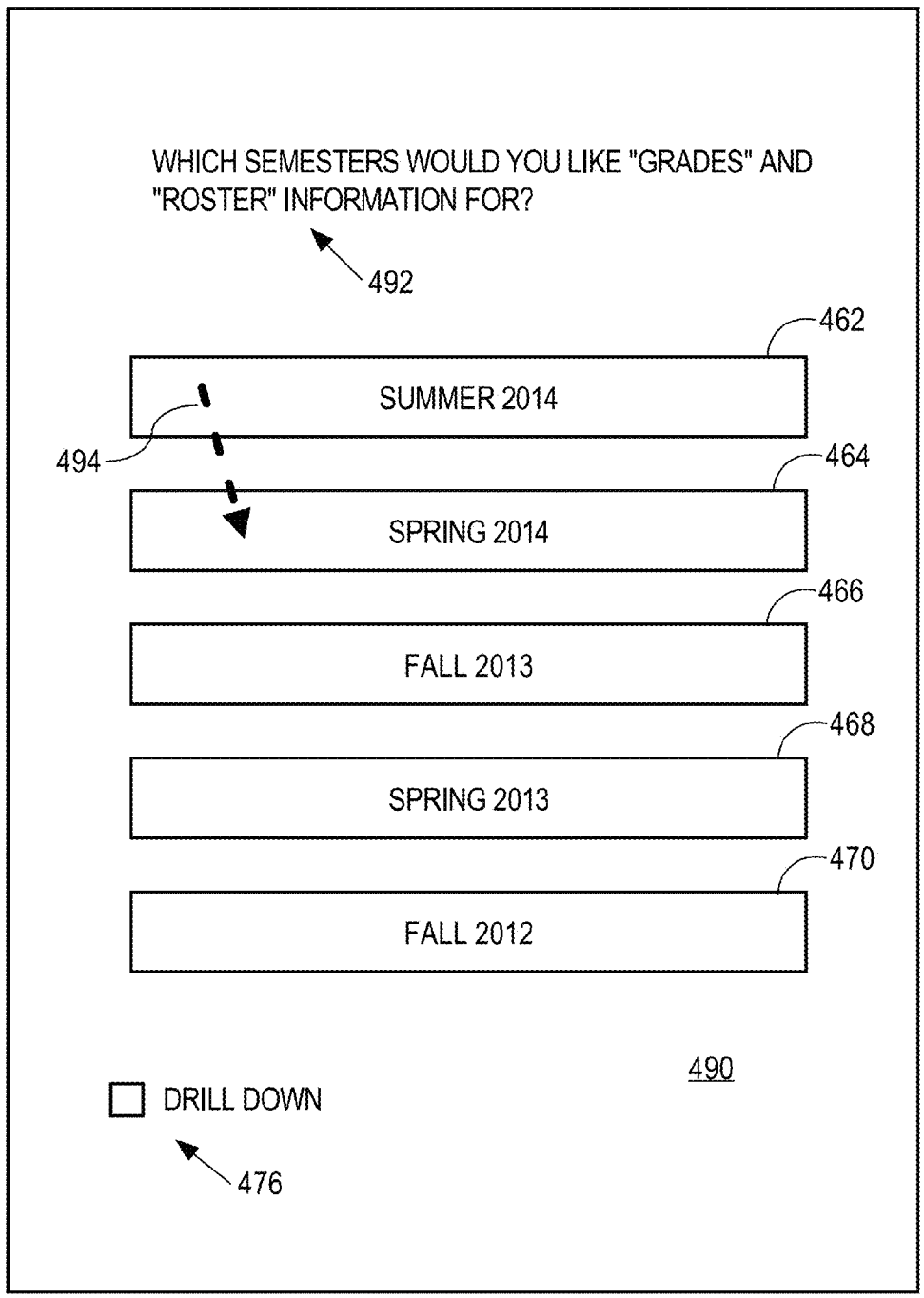

In another embodiment, GUI configuration service 124 does not display items 414 and 412 in GUIs similar to GUIs 460 and 480, but identifies information items that satisfy selection criteria of the originally-selected items top-level items without giving the user further opportunity to select one or more of the originally selected items (i.e., items 412 and 414). To illustrate, GUI 490 of FIG. 4G depicts instructions 492 that remind the user of the user's previous selection of the "grades" and "roster" items. In the embodiment of GUI 490, instructions 492 also provide context for items 462-470 displayed for the user's selection (i.e., items 462-470 represent semesters). Action service 122 performs further processing upon detecting swipe 494, which selects particular semesters for which the user would like "grades" and "roster" information as described above.

Data Display Items

Figure 5A:
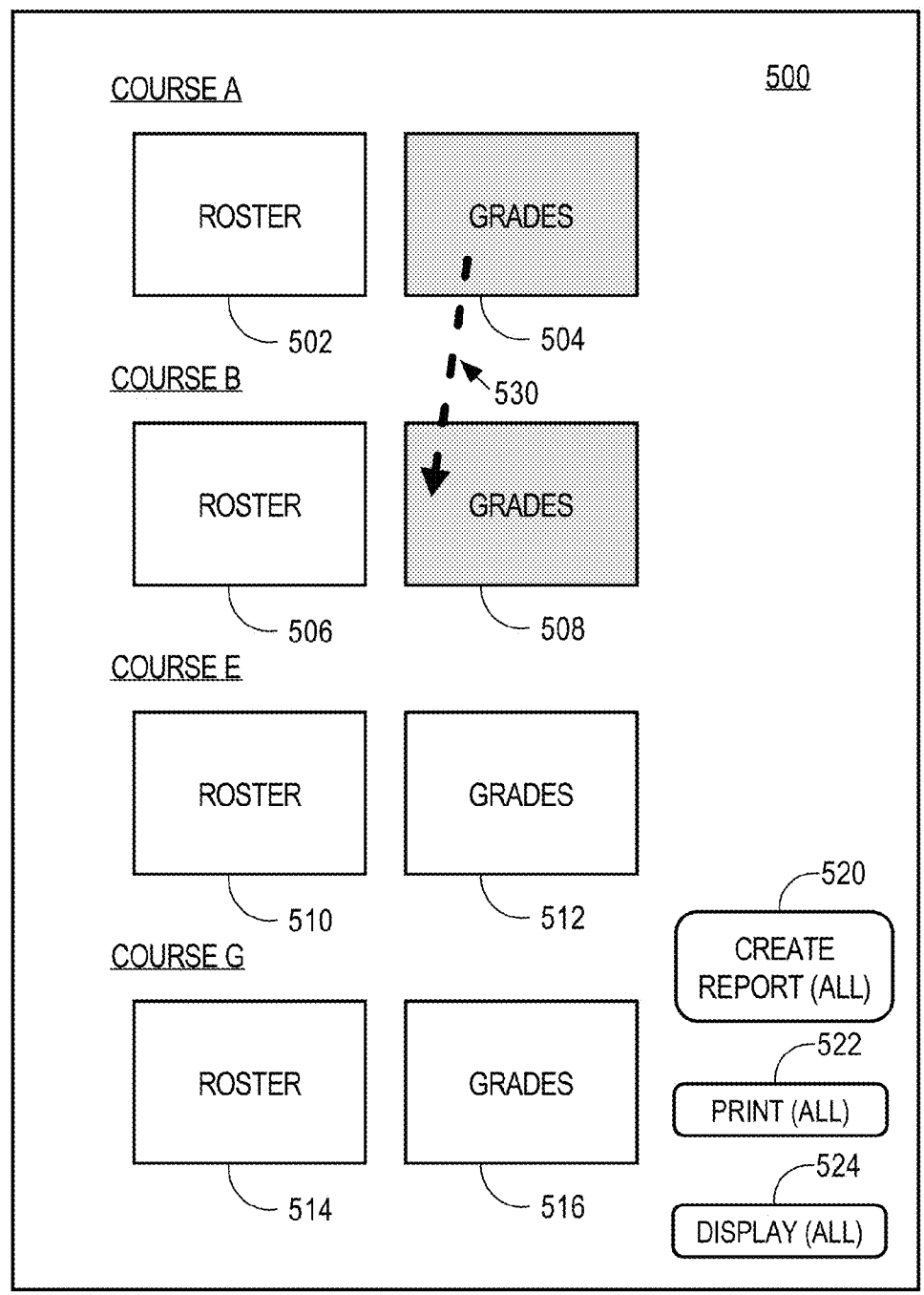
FIGS. 5A-B depict interactions with GUIs displaying multiple items and identification of one or more actions to perform on selected items.

According to an embodiment, multi-selection client 112 displays a GUI that includes items that represent data from information items 142. Displayed items that represent particular information items from information items 142 are referred to herein as "data display items". For example, referring to FIG. 5A, a web page 116 includes GUI 500. GUI 500 depicts data display items 502-516 that are the results of the selection depicted in GUI 480 of FIG. 4F (described in detail above). According to embodiments, data display items may depict groups of information items, or may depict individual information items, or may display information from information items in detailed or summary form. Furthermore, a GUI with data display items may or may not display results from a user selecting one or more selection criteria items.

A user may utilize a GUI with data display items (such as GUI 500) to select the data items on which to perform an action. For example, in the embodiment illustrated in FIGS. 5A and 5B, multi-selection client 112 detects co-selection of data display items 504 and 508 via swipe 530. Swipe 530, which co-selects data display items 504 and 508, effectively selects the information items that correspond to data display items 504 and 508. In the present example, those information items are the grades for Course A and Course B, respectively.

Action Items

Figure 5B:
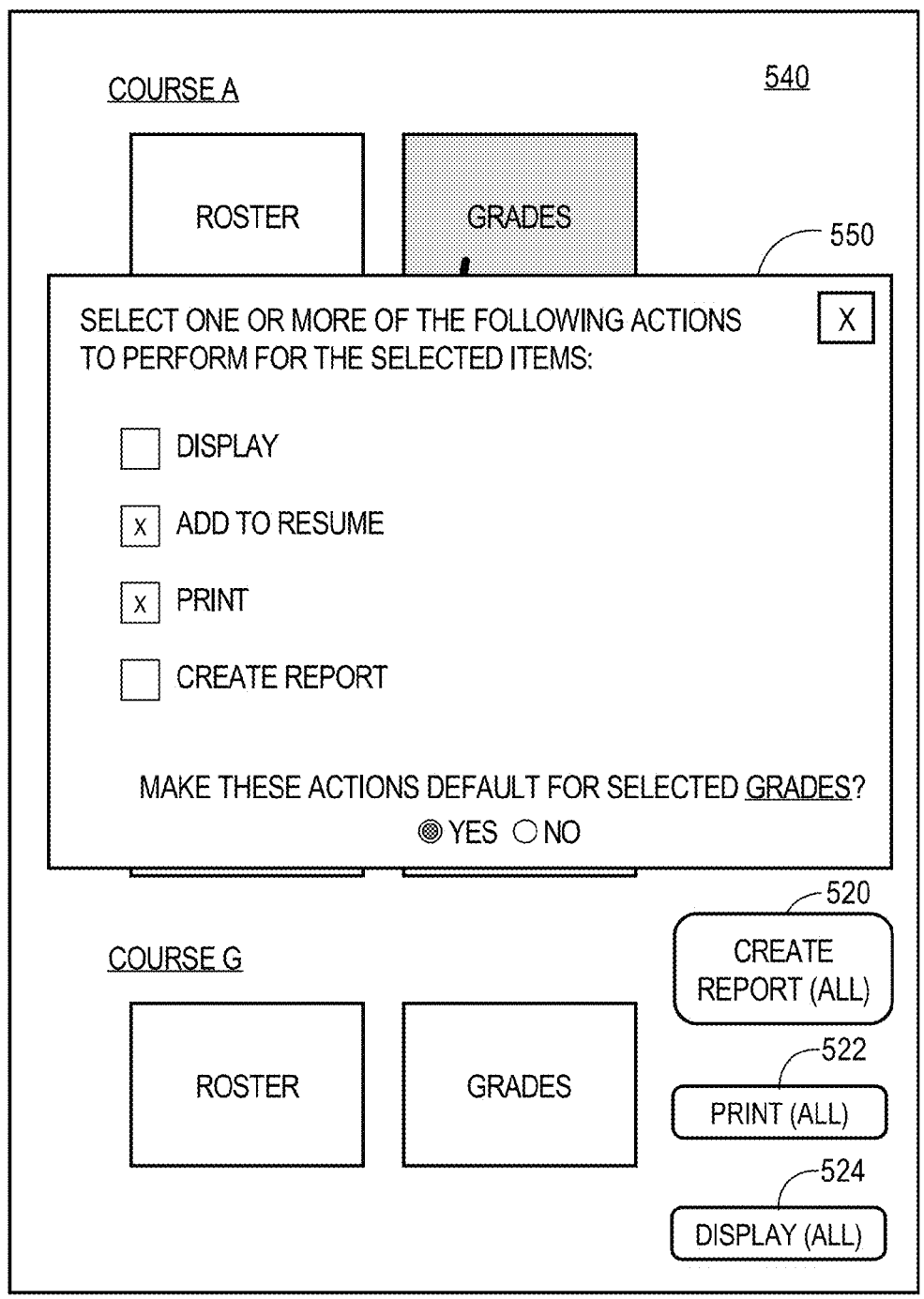

According to one embodiment, in response to selection of one or more data display items in GUI 500, the user is presented with a set of action items, such as those depicted in window 550 of FIG. 5B. As used herein, "action items" refers to items that correspond to commands that may be performed on an underlying data set. Such commands may be, for example, delete, modify, duplicate, etc. In the example illustrated in FIG. 5B, the action items are for the actions of: displaying, adding to a resume, printing, and creating a report.

The action to which action items correspond may vary based on the nature of the underlying data items. For example, when the underlying data items are grades, the actions may be those depicted in FIG. 5B. On the other hand, if the underlying data items are videos, the action may include actions such as: delete, check out, play, print, send, buy, rent, etc.

According to embodiments, multi-selection client 112 provides the user with one or more "process all" buttons that allow the user to perform a function for all of the displayed data items (e.g., create report button 520, print button 522, and display button 524). A user may also perform one or more functions (or actions) on a subset of the displayed data items by co-selecting the items, and then performing the function on only the selected items.

Default Actions

According to one embodiment, in response to swipe 530, action service 122 determines whether there are any default actions that may be performed for all of the co-selected information items. Particular actions may be specific to particular types of information items. For example, dimension transformation actions are applicable to information items with dimension (such as images and videos) but are not applicable to information items without dimension (such as text and audio). However, other actions may be applied to any item, such as a buy action, or a print action.

If one or more actions that are applicable to all of the targeted information items are identified as default actions, action service 122 causes the one or more default actions to be performed for the selected items, i.e., on the information items that the data display items represent.

According to an embodiment, if no default actions are identified, action service 122 sends information for applicable actions to multi-selection client 112. In response, multi-selection client 112 displays a mechanism for selecting one or more actions to perform.

Co-Selecting Actions

Example GUI 540 of FIG. 5B depicts a window 550 that displays actions that the user may perform for selected data display items 504 and 508. In GUI 540, the user has selected "add to resume" and "print" as the actions to perform for co-selected items 504 and 508. According to another embodiment, action options are presented to a user in a format that allows the user to select one or more actions using point- or swipe-style interactions as described herein.

The user further has the option of setting selected actions as default actions for the session, or as persistent default actions to persist across sessions. A particular session ends when one or more of the following occur: a user logs out of multi-selection client 112; the GUI through which the user has selected items is unloaded; all GUIs related to the GUI through which the user has selected items are unloaded, etc.

Action service 122 causes the selected one or more actions to be performed for the targeted information items. In the example of GUI 540, the user has selected the action "print" for items 504 and 508. As such, action service 122 prepares print data with information from the grades-type information items associated with the requesting user from courses A and B (as indicated by selection of items 504 and 508 by the particular user).

In the example of GUI 540, the user has selected the action "add to resume" for items 504 and 508. As such, action service 122 adds information to a resume object for the user. This resume object includes information that the user wishes to include in the user's resume, which can be automatically formatted for printing from information in the resume object. By including the grades information from courses A and B into the user's resume object, resume print data or document data formatted from the resume object would include information about one or more grades that the user attained in course A and course B.

One action that may be applied to co-selected data display items is entering the corresponding information items into a queue. Action service 122 may order selected information items based on an order in which the information items were selected by the user. For example, a user may co-select the data display items using a swipe-style interaction, and action service 122 enters the items in the queue based on the order in which the user swiped over the items. As a further example, a user may co-select the data display items using concurrent point-style interactions with different starting times. In this example, action service 122 includes the items in the queue based on the starting times of the point-style interactions that selected the items, respectively.

As yet a further example, action service 122 includes co-selected data display items in a queue in an order dictated by metadata of the corresponding information items. To illustrate, information items to be entered into a queue are learning objects, at least some of which have prerequisite learning objects or skills. The user will attempt completion of the selected learning objects based on the order that the objects are in the queue. As such, action service 122 puts the selected learning objects into the queue such that a first learning object that is a prerequisite for a second co-selected learning object is included in the queue before the second learning object. This method of ordering selected information items overrides the order in which a user selected the learning object items.

According to yet another embodiment, action service 122 determines that the user has not completed a learning object that is a prerequisite for a selected learning object in the queue (where the prerequisite learning object is not selected to be entered into the queue). In response to determining that the user has not completed the prerequisite learning object, action service 122 automatically includes the prerequisite learning object into the queue before the selected learning object. According to embodiments, action service 122 automatically informs the user of the unfinished prerequisite.

Multi-Selection Using Point-Style Interactions

Many times, a user of a GUI that displays multiple items is interested in selecting multiple items from the display, e.g., to form a command from the selected items; to have one or more actions performed on the selected items; etc. FIG. 6 depicts a flowchart 600 for selecting multiple items via multiple concurrent point-style interactions with a graphical user interface.

At step 602 of flowchart 600, a computing device displays a plurality of items in a graphical user interface. For example, multi-selection client 112 receives information for GUI 400 of FIG. 4A from GUI configuration service 124. Multi-selection client 112 causes client 110 to display GUI 400, which displays a plurality of items 402-414.

At step 604, the computing device detects two or more concurrent point-style interactions, each of which targets a respective targeted item of the plurality of items displayed in the graphical user interface, wherein at least two of the two or more concurrent point-style interactions target at least two discontiguous items of the targeted items. For example, multi-selection client 112, running on client device 110, detects three concurrent point-style interactions ("points") 442-446 depicted in GUI 440 of FIG. 4C. Concurrent interactions are interactions whose durations (between start and stop times) overlap.

Point 442 targets syllabus item 402, point 444 targets recent activity item 404, and point 446 targets grades item 414. Syllabus item 402 and recent activity item 404 are laterally contiguous because they are displayed next to each other in GUI 400. Syllabus item 402 is discontiguous from grades item 414 because there is at least one item between syllabus item 402 and grades item 414 (i.e., instructor announcement item 408).

According to an embodiment, recent activity item 404 and roster item 412 are diagonally contiguous because they are displayed directly diagonally from each other in GUI 400. According to another embodiment, recent activity item 404 and roster item 412 are considered discontiguous because they are not laterally contiguous.

Returning to flowchart 600, at step 606, in response to detecting the two or more concurrent point-style interactions, the targeted items are simultaneously selected. For example, in response to detecting concurrent point-style interactions 442-446, multi-selection client 112 determines that the user has simultaneously selected (or "co-selected") syllabus item 402, recent activity item 404, and grades item 414.

At step 608, while the targeted items are selected, one or more actions are performed based, at least in part, on the targeted items being selected. For example, multi-selection client 112 sends information identifying the multiple co-selected items (e.g., items 402, 404, and 414) to action service 122 at server device 120. Action service 122 identifies one or more actions to be performed based on the identified items.

According to embodiments, action service 122 identifies the one or more actions based on any technique described herein. For example, according to an embodiment, action service 122 identifies at least one of the one or more actions based, at least in part, on selection criteria associated with at least one of the co-selected items, as described above. According to another embodiment, action service 122 identifies at least one of the one or more actions from other mapping data that maps combinations of selected items to one or more actions, as described in further detail below.

Overcoming Limitations of Multi-Selection

Multi-selection functionality with point-style interactions is limited by the natural limitations of the human body. For example, using one or two hands, a user will not be able to select more items than the user has fingers. Furthermore, some combinations of displayed items may be awkward to select using only one or two hands because of how fingers naturally move.

Thus, according to an embodiment, when multi-selection client 112 detects two or more concurrent point-style interactions that qualify as a limited touch scenario, according to one or more limited touch scenario rules, multi-selection client 112 automatically identifies one or more additional displayed items to visually highlight in the GUI based, at least in part, on the items targeted by the detected two or more concurrent point-style interactions. Identification and highlighting of additional items is described in further detail below.

The user may select any of the highlighted items to include in the set of currently co-selected items. In response to detecting selection of one or more highlighted items, multi-selection client 112 automatically co-selects the selected (highlighted) item(s) with the items that are currently selected. According to an embodiment, multi-selection client 112 only allows the user to select one or more of the highlighted items to include in the set of targeted items, e.g., by deactivating graphical user interface controls associated with those items, of the plurality of displayed items, that are not highlighted items.

One or more limited touch scenario rules identify one or more patterns of concurrent point-style interactions that indicate a possibility that the user could not concurrently select all desired items in the GUI with point-style interactions. For example, limited touch scenario rules identify the following features or combinations of features of limited touch scenarios:

The number of concurrent point-style interactions equals a predefined number, such as 4, 5, 8, 9, or 10. These predefined numbers may be configurable by the user.

Locations of items targeted by the concurrent point-style interactions. For example, the distance between the most extreme locations of selected items exceed a threshold distance, e.g., that is based on the average limitation of the human hand, or a limitation of the user's hand as determined from usage or profile data gathered for the user.

One or more items that are commonly selected in combination with the one or more targeted items are unselected, or are unselected and are located in a location that is potentially difficult to reach given the locations of the selected items.

Mapping Actions to Combinations of Items

According to embodiments, action service 122 identifies one or more actions to perform from mapping data that maps combinations of items to one or more actions. FIG. 7 depicts a flowchart 700 for identifying a particular action mapped to a combination of items that are co-selected in a GUI. At step 702 of flowchart 700, a computing device displays a plurality of items in a graphical user interface. For example, multi-selection client 112 causes client device 110 to display GUI 400 of FIG. 4A. GUI 400 displays a plurality of selection criteria items 402-414, as described above.

At step 704, a plurality of mappings is stored, wherein each mapping of the plurality of mappings maps a distinct combination of items, from the plurality of items, to a corresponding action. For example, action service 122 stores, in database 140, a plurality of mappings that maps one or more distinct combinations of selection criteria items 402-414 to actions that may be performed over information items 142. In the plurality of mappings, each mapping maps a distinct combination of selection criteria items, from the plurality of items, to a corresponding action.

Mappings of selection criteria items allows a user to personalize actions performed based on selection criteria items. To illustrate, action service 122 stores, in database 140, a first mapping that maps item combination (402, 404, 410) to the action "display syllabus drafts, created since the start of the most recent semester, for classes that the requesting user teaches". Action service 122 provides the user with a mechanism for including mappings between combinations of selection criteria items and actions that are not included in the database. Such mapping data may be used just for the particular user that created the mappings, or may also be used for users similar to the creating user. Through this mechanism, a user adds mapping data, to database 140, that maps item combination (402, 404, 410) to the action "email, to the requesting user's email address, syllabus drafts that are (a) created since the start of the most recent semester and (b) for classes that the requesting user teaches".

As a further example, action service 122 stores, in database 140, a plurality of mappings that map one or more distinct combinations of data display items 502-516 (depicted in GUI 500 of FIG. 5A) to actions that may be performed over information items (of information items 142) that correspond to the data display items. In the plurality of mappings, each mapping maps a distinct combination of the data display items, from the plurality of items, to a corresponding action. For example, action service 122 stores, in database 140, a mapping that maps item combination (504 and 508) to the action "print".

According to an embodiment, action service 122 identifies and stores mappings that are based on historical usage information, as described in further detail below. For example, a user selects particular actions to be performed for the items that the user has co-selected (i.e., items 504 and 508) according to the example of GUI 540 as described above. In response to receiving the user selection of the particular actions via window 550, action service 122 stores mapping data that maps the actions "add to resume" and "print" to the combination of items 504 and 508. According to embodiments, action service 122 stores such mapping data in response to the user indicating that the actions are the default actions for the co-selected items.

Action service 122 records information identifying the user that associated the actions to the combination of items. According to an embodiment, action service 122 only uses such a mapping for the user that created the mapping. According to an embodiment, action service 122 uses such a mapping to inform suggestions of actions to perform for the combination of items, or for combinations of items that are similar to the mapped combination of items.

Combinations of items may be considered similar when the combinations of items include items of the same type, created at or near the same time, etc. Furthermore, combinations of items may be considered similar based on: information from a user (e.g., indicating that particular combinations of items are similar); information from an administrator; historical usage data; etc.

Automatically Performing Mapped Actions for Co-Selected Items

At step 706, the computing device detects an interaction with the graphical user interface that co-selects two or more items of the plurality of items. For example, multi-selection client 112 detects that a user has co-selected items 404, 406, and 410 displayed in GUI 420 (of FIG. 4B) by swiping over portions of the GUI that depict those items via swipe 436.

Selected items may be visually indicated, e.g., by a color of the items as depicted in GUI 420. No other items are selected (i.e., items 402, 408, 412, and 414 remain unselected) by swipe 436 because no other items were intersected by the swipe.

At step 708, in response to detecting the interaction, the following steps are performed: based on the plurality of mappings, identifying a particular action that is mapped to a combination of the two or more items; and performing the particular action. For example, in response to detecting swipe 436, multi-selection client 112 sends information indicating which items were selected by the swipe to action service 122, i.e., items 404, 406, and 410. Action service 122 identifies one or more actions that are mapped to a combination of items 404, 406, and 410 and causes at least one of the mapped actions to be performed.

To illustrate, action service 122 identifies a particular mapping in database 140 that maps the combination of items 402, 404, and 410 to a query, over information items 142, that returns information for recently drafted private messages authored by the user making the request. Action service 122 causes this query to be run over information items 142 and receives the results of the query.

According to an embodiment, if no other action is mapped to the combination of items, then action service 122 causes GUI configuration service 124 to send multi-selection client 112 a GUI, where the GUI displays items that represent the results of the query. The results of the query may be grouped, as described above, and the items displayed in the GUI represent the groups of information items from the query result. According to embodiments, if another action is mapped to the combination of items 404, 406, and 410 within the mapping data, then action service 122 causes that action to be performed instead of or in addition to displaying data display items that correspond to the query results.

According to an embodiment, if action service 122 identifies multiple actions that are mapped to the identified combination of items, then action service 122 performs all of the actions mapped to the combination of items and returns query results to multi-selection client 112 for display, as described above.

According to an embodiment, if action service 122 identifies multiple actions that are mapped to the identified combination of items, then action service 122 determines whether there are one or more default actions among the mapped actions for the combination of items. In response to identifying one or more default actions, action service 122 performs the one or more default actions and does not perform actions of the mapped actions that are not marked as default. According to an embodiment, display of query results is an implied default action for every combination of items that is mapped to performance of a query.

According to an embodiment, if action service 122 identifies multiple actions that are mapped to the identified combination of items, then action service 122 causes multi-selection client 112 to display one or more action items that, either individually or in one or more combinations, represent the multiple actions mapped to the user's selected combination of items. A user may then select one or more of the presented actions to perform.

In response to determining that no default action is set for an identified combination of items, action service 122 sends information, to multi-selection client 112, identifying the multiple mapped actions. Multi-selection client 112 displays the information identifying the multiple mapped actions via a GUI, such as GUI 540 (FIG. 5B) and provides a mechanism for the user to select one or more actions to perform. Multi-selection client 112 also provides the user a mechanism by which the user identifies one or more default actions from among the multiple actions mapped to the identified combination of items. Multi-selection client 112 receives information, from the user via the GUI, selecting one or more actions from among the multiple actions mapped to the identified combination of items. In response to receiving this selection information, multi-selection client 112 sends information identifying the selected one or more actions to action service 122, which causes the identified actions to be performed.

Action service 122 may cause processing of information items 142 to be performed for actions that are mapped to a selected combination of items while multi-selection client 112 is waiting for the user to select a particular action, e.g., as depicted in GUI 540 of FIG. 5B.

According to yet another embodiment, action service 122 determines that the combination of items that the user has selected is mapped to the action of displaying a further set of items for the user to select. In other words, the combination of selected items is mapped to further options. In this embodiment, multi-selection client 112 displays a GUI with action items that represent the further options for the user to select from.

According to embodiments, a user may override a default action, which causes action service 122 to display a list of possible actions to the user. For example, a GUI may include a control that, when activated, overrides any default action and displays possible actions for items that are currently co-selected in the GUI. As another example, a GUI may include a check box that indicates whether the user wishes the system to perform default actions or not. As yet another example, a user may press and hold the last item of a set of co-selected items, which overrides any default action. When multi-selection client 112 determines that the user has pressed on a particular item for greater than an established threshold amount of time, multi-selection client 112 displays a list of actions that may be performed on the currently co-selected items rather than automatically performing any default action. Multi-selection client 112 may cause one or more default actions to be marked within a displayed list of actions.

Detecting Completion of a GUI Interaction

According to embodiments, action service 122 waits to perform one or more actions, based on selected items, until multi-selection client 112 detects completion of a user's interaction with a displayed GUI. In one embodiment, multi-selection client 112 detects completion of an interaction, such as swipe-style interaction 436 of GUI 420 (FIG. 4B) or concurrent point-style interactions 442, 444, and 446 of GUI 440 (FIG. 4C), by detecting termination of one or more interaction events that enact the swipes or points, such as when the user ends a touch interaction event that enacts swipe 436 (i.e., at end point 438) via a touch screen, etc. However, the fact that a user has terminated a particular interaction event does not always indicate that the user has completed interacting with a displayed GUI, or in other words, that the user has selected all items that the user wants to select.

According to an embodiment, multi-selection client 112 allows a user to select all desired items regardless of a number of interaction events or duration between interaction events that interact with the GUI. Once all desired items are selected, multi-selection client 112 allows the user to indicate that all desired items are selected via a control in a GUI. For example, GUI 450 of FIG. 4D includes a go button 452. In the example of GUI 450, a user swipes over items 406 and 404 (via swipe 454) and performs another swipe 456 to select items 410 and 402. After selecting all desired items (i.e., items 402, 404, 406, and 410) using swipes 454 and 456, the user activates go button 452. The user may activate go button 452 using an interaction event that enacts one of swipes 454 or 456 (not depicted in GUI 450), or using an interaction event that is distinct from the interaction events that enact swipes 454 and 456.

In response to detecting activation of go button 452, multi-selection client 112 determines that the user has completed the user interaction with GUI 450. In this embodiment, the user may use any combination of swipes and point-style interactions to select items. All items that are selected when go button 452 is activated are treated, by multi-selection client 112, as co-selected.

According to another embodiment, a GUI, such as GUI 400, includes a control (not shown) that the user activates to indicate to multi-selection client 112, that all of the items selected while the control is activated should be co-selected. Thus, multi-selection client 112 processes, as co-selected, all items that are selected when the user either (a) activates the control a second time, or (b) activates a go button such as go button 452.

According to another embodiment, multi-selection client 112 detects completion of a user's interaction with a GUI when a predetermined amount of time lapses after the termination of an interaction event with the GUI. In this embodiment, a user may initiate an interaction with a GUI with an interaction event, and then continue to add selected items to the set of selected items by starting a new swipe or point-style interaction within a pre-defined amount of time after stopping the previous interaction event. A user or administrator may set such a pre-defined amount of time, called herein a "grace period", to be, e.g., one second.

FIG. 8 depicts a GUI 800 with a grid of displayed items. To illustrate the grace period in the context of GUI 800, a user has configured multi-selection client 112 to give a grace period of one second to identify the completion of a user's interaction with GUI 800. Such a grace period may be generally applicable for the user, or may be specific to a particular GUI.

Multi-selection client 112 detects swipe 802. Because of the grace period of one second, if the user starts swipe 804 within one second of ending swipe 802, then all of the items swiped over by swipe 804 are considered to be co-selected with the items swiped over by swipe 802. However, if the user starts swipe 804 after the one second grace period has tolled, then multi-selection client 112 considers swipe 802 completed prior to the user initiating the interaction event that enacts swipe 804, and the items swiped over by swipe 804 are not co-selected with the items swiped over by swipe 802.

A point-style interaction may also be used to add items to the set of targeted items when the point-style interaction is performed before the grace period tolls after terminating the previous interaction event. Likewise, a point-style interaction may trigger initiation of a grace period within which a user may add further items to the set of selected items. As a further example, multi-selection client 112 detects swipe 802 in GUI 800. If point-style interaction ("point") 806 is detected within one second of the user ending swipe 802, based on the grace period of one second, then the item targeted by point 806 is considered co-selected with the items swiped over by swipe 802. Then, if the user initiates swipe 804 within one second of the user performing point 806, then, because of the grace period of one second, the items swiped over by swipe 804 are considered co-selected with the items swiped over by swipe 802 and with the item targeted by point 806.

According to embodiments, a user may activate a control (such as go button 452) to indicate to multi-selection client 112 that the user is finished interacting with a GUI. In the context of embodiments enacting a grace period, when multi-selection client 112 detects activation of such a control, multi-selection client 112 detects completion of the user's interaction with the current GUI without waiting for any remaining grace period to toll.

According to another embodiment, a GUI includes a mechanism by which the user may include additional items to a current selection. In response to detecting activation of such a mechanism, multi-selection client 112 visually highlights the items that are currently co-selected and allows the user to select additional items to be included in the current selection. When multi-selection client 112 detects that the user has completed the user's interaction with the GUI according to any embodiment described above, multi-selection client 112 processes the additionally selected items with the previously selected items as co-selected items.

Historical Usage Database

According to embodiments, instrumentation service 126 of server device 120 stores historical usage data comprising instrumentation items 144 in database 140. Specifically, multi-selection client 112 records user interactions with GUIs presented by multi-selection client 112 in instrumentation items, and sends the instrumentation items to instrumentation service 126 for processing and storage to instrumentation items 144 in database 140.

Instrumentation items indicate ways that users interact with GUIs. According to embodiments, an instrumentation item includes one or more of: a user identifier, one or more attributes of a user, item identifiers for items that the user has co-selected, how a user maps particular combinations of items to actions, recommendations from multi-selection client 112 that the user has ignored or implemented, types of interactions by which the user co-selects items, timestamps of user interactions with GUIs, GUIs that the user has interacted with, configurations of GUIs that the user has interacted with, etc.

The services of server device 120 can utilize the information in instrumentation items 144 to customize GUI configurations for the user (i.e., to place items displayed in a GUI in configurations that are conducive to how the user interacts with the GUI, or to how users similar to a particular user interact with the GUI), to set mappings between combinations of items and actions (or to suggest such mappings to a user), to identify combinations of items to highlight in a GUI as described in further detail below, to identify limited touch scenarios, etc.

For example, in response to a user selecting one or more actions to perform for a particular combination of items in a particular GUI, multi-selection client 112 creates and sends one or more instrumentation items to instrumentation service 126, where the instrumentation items indicate the combination of selected items, the one or more actions selected for the combination of items, the set of actions that multi-selection client 112 presented to the user to selection the one or more actions from, an identifier of the user, etc. Instrumentation service 126 records, in instrumentation items 144 at database 140, the instrumentation items.

According to embodiments, instrumentation service 126 also includes one or more aspects of the instrumentation items in a portion of database 140 dedicated to a summary of historical usage data. Such a summary may be used by the services of server device 120 to quickly customize GUIs, recommendations, etc. to particular users.

Customizing a Graphical User Interface Based on Usage of the Interface

According to embodiments, GUI configuration service 124 uses information about how users interact with graphical user interfaces, i.e., as recorded in instrumentation items 144 and/or other historical usage data, to inform how the graphical user interfaces are configured. As such, GUI configuration service 124 can dynamically configure graphical user interfaces that allow users to more easily select multiple items and formulate complex commands via selection of the multiple items based on how users have previously interacted with the GUIs. Using historical usage information to arrange items in a GUI allows GUI configuration service 124 to automatically produce GUIs that are optimized for particular user's use, without requiring human hours to analyze usage of the GUI and arrange the GUI items.

FIG. 9 depicts a flowchart 900 for adjusting the configuration of a graphical user interface based on historical usage data. At step 902, first configuration information that defines a first configuration of a graphical user interface is sent to a client at which the graphical user interface is to be displayed; wherein, in the first configuration, the graphical user interface displays a plurality of items in a first arrangement; wherein the plurality of items includes a first item and a second item; and wherein, according to the first arrangement, the first item is displayed discontiguous to the second item. For example, GUI configuration service 124 sends information for web page 116, that includes a GUI such as GUI 1000 of FIG. 10A, to client device 110. Browser 114 of client device 110 interprets the information for web page 116 and displays, via a display device, GUI 1000.

Figure 10A:
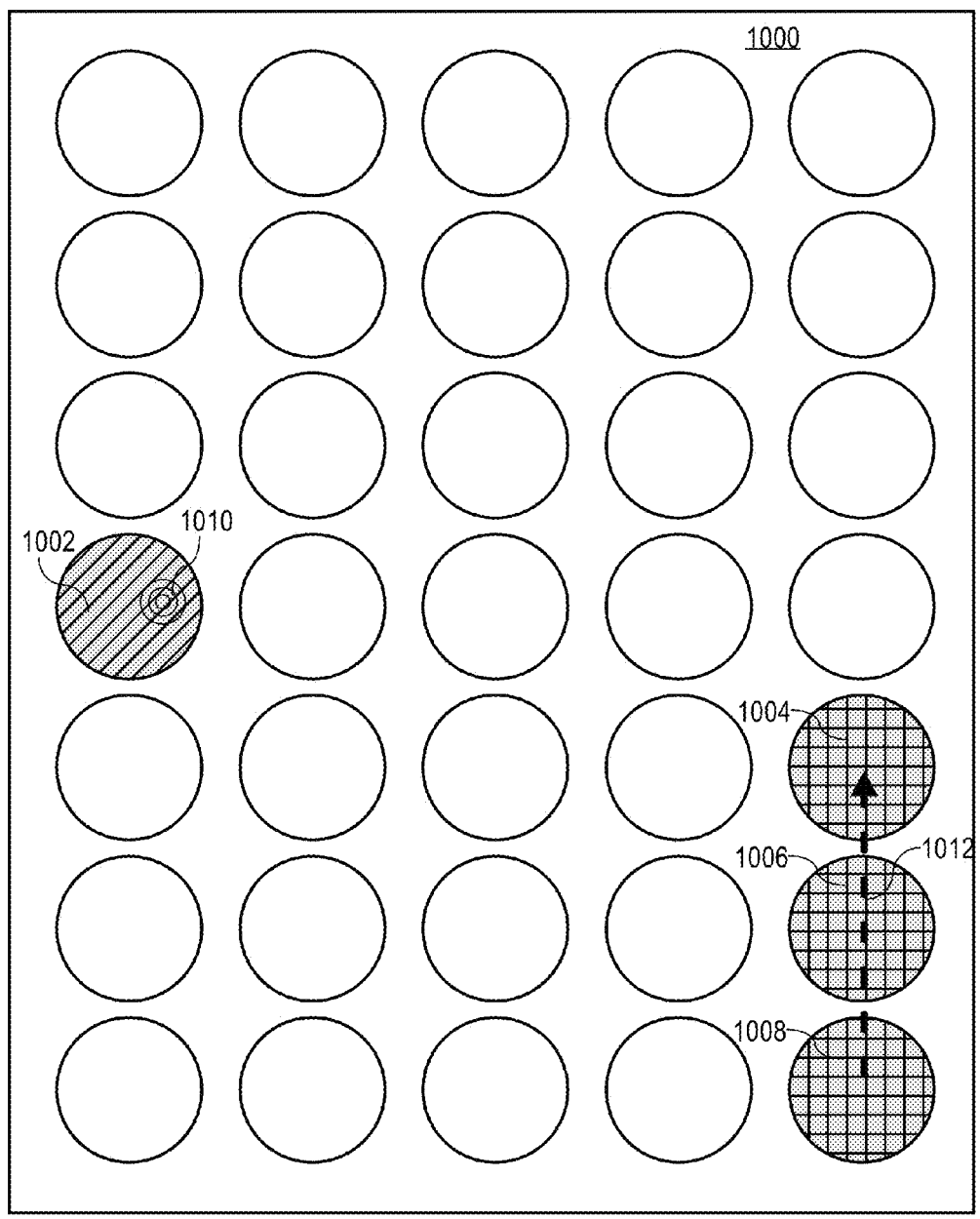
FIGS. 10A-C depict interactions with GUIs displaying multiple items.

The information for GUI 1000 is configuration information that organizes a plurality of items displayed in GUI 1000 in a first arrangement depicted in FIG. 10A, where the plurality of items includes items 1002-1008. In the arrangement of GUI 1000, each of items 1004-1008 are contiguous to at least one of the others of items 1004-1008. Further, in the arrangement depicted in GUI 1000, item 1002 is discontiguous to all of items 1004-1008.

At step 904, usage information indicating that a user co-selected both the first item and the second item is received. For example, multi-selection client 112 detects that a user co-selects item 1002 (i.e., via point-style interaction 1010) and items 1004, 1006, and 1008 (i.e., via swipe 1012) such that items 1002-1008 are selected concurrently. Multi-selection client 112 creates an instrumentation item that indicates that the user co-selected items 1002-1008 and sends the instrumentation item for processing and/or storage to instrumentation service 126.

According to an embodiment, steps 906 and 908 of flowchart 900 are performed after receiving the usage information of step 904.

At step 906, it is determined, based, at least in part, on the usage information, that a second arrangement should be used for the plurality of items in the graphical user interface; wherein, according to the second arrangement, the first item is displayed contiguous to the second item. For example, upon receiving the instrumentation item that indicates that the user co-selected items 1002-1008, instrumentation service 126 identifies a trend (of at least one instance) of items 1002-1008 being a common combination of items. According to an embodiment, instrumentation service 126 records the trend information in a summary of historical usage in database 140.

From instrumentation items 144 (which includes the above-mentioned instrumentation item) and/or from the summary of historical usage in database 140, GUI configuration service 124 determines that item 1002 should be displayed contiguous to at least one of items 1004-1008 (i.e., in a second arrangement). GUI configuration service 124 may make this determination in response to receiving notification of the new instrumentation item, in response to receiving a new request for GUI 1000, etc.

Furthermore, such a determination may be further based on multiple instrumentation items and/or other historical usage data, e.g., recording other instances of the same user co-selecting items 1002 and one or more of items 1004-1008; recording instances where other users have co-selected items 1002 and one or more of items 1004-1008; etc. According to embodiments, GUI configuration service 124 uses historical usage data that meets certain criteria to perform an evaluation of how to configure graphical user interfaces. For example, to configure a GUI for a particular user, GUI configuration service 124 uses historical usage data that meets one or more of the following criteria:

- the data was gathered from usage of the GUI that GUI configuration service 124 is configuring;
- the data was gathered sufficiently recently (i.e., within the last day, the last week, the last month, the current semester, the current calendar year, the current academic year, etc.);
- the data was gathered from the particular user;
- the data was gathered from users that are similar to the particular user;
- etc.

According to an embodiment, GUI configuration service 124 configures a GUI that is delivered to a particular user based on historical usage information from users that are similar to the particular user. As such, instrumentation service 126 identifies similar users, e.g., when instrumentation service 126 performs analysis on instrumentation items that instrumentation service 126 includes in a historical usage summary.

For example, to identify similar users, instrumentation service 126 compares attributes of users from user profiles. User profiles include one or more attributes of an associated user, e.g., vital information (name, birthdate, address); organizations associated with the user (current scholastic major, classes currently being taken, projects that the user is currently assigned to, etc.); history of the user (courses that the user has completed, GUIs that the user has accessed, etc.); transient attributes of a user (the user's current status, Global Positioning System (GPS) location, mood, etc.); etc. Instrumentation service 126 may determine that two users are similar based on similarities between attributes of the two users' profiles.

According to embodiments, particular profile attributes that are similar, or particular combinations of similar profile attributes among users, is sufficient to identify the users as similar. For example, instrumentation service 126 determines that two users are similar because the profiles of the two users indicate that the users are associated with similar organizations, e.g., the users are enrolled in the same scholastic major (or course of study), the users have the same employer, the users are enrolled in scholastic majors that are known to be similar (e.g., where both majors are included in a list of similar majors), etc.

As another example, instrumentation service 126 determines that two users are similar because the profiles of the two users indicate that the users have both accessed information on the same subject matter. Information about subject matter that users have accessed may come from user profiles, browser history, etc. Users that have accessed one or more similar topics may have similar interests and also have similar needs with respect to graphical user interfaces.

As a further example, instrumentation service 126 determines that two users are similar because of a combination of similar profile attributes of the users. For example, instrumentation service 126 determines that two users are similar because the profiles of the two users indicate that the users have both accessed information on the same subject matter and also that the users are the same age.

As yet another example, instrumentation service 126 determines that two users are similar because the users have indicated that they like similar news articles or other media or social content. Such content may be determined similar based on keywords, titles, categories, etc. Furthermore, instrumentation service 126 may determine that particular users are similar based, at least in part, on the users posting messages in one or more of the same discussion threads.

Furthermore, instrumentation service 126 determines that users are similar based on language that the users put into messages, articles, social content, and/or papers that the users author. For example, instrumentation service 126 determines that particular users are similar based on the users' usage of similar slang language in authored content.

Returning to flowchart 900, at step 908, second configuration information that defines the second configuration of the graphical user interface is sent to a target client, wherein, in the second configuration, the graphical user interface displays the plurality of items in a second arrangement. Continuing with the example of GUI 1000, GUI configuration service 124 sends information for a second configuration of the plurality of items displayed in GUI 1000 to a target client. The second configuration defines a configuration of the items displayed in GUI 1000 that arranges item 1002 contiguous to at least one of items 1004-1008, based on the determination of GUI configuration service 124 that item 1002 should be displayed contiguous to at least one of items 1004-1008.

Figure 10B:
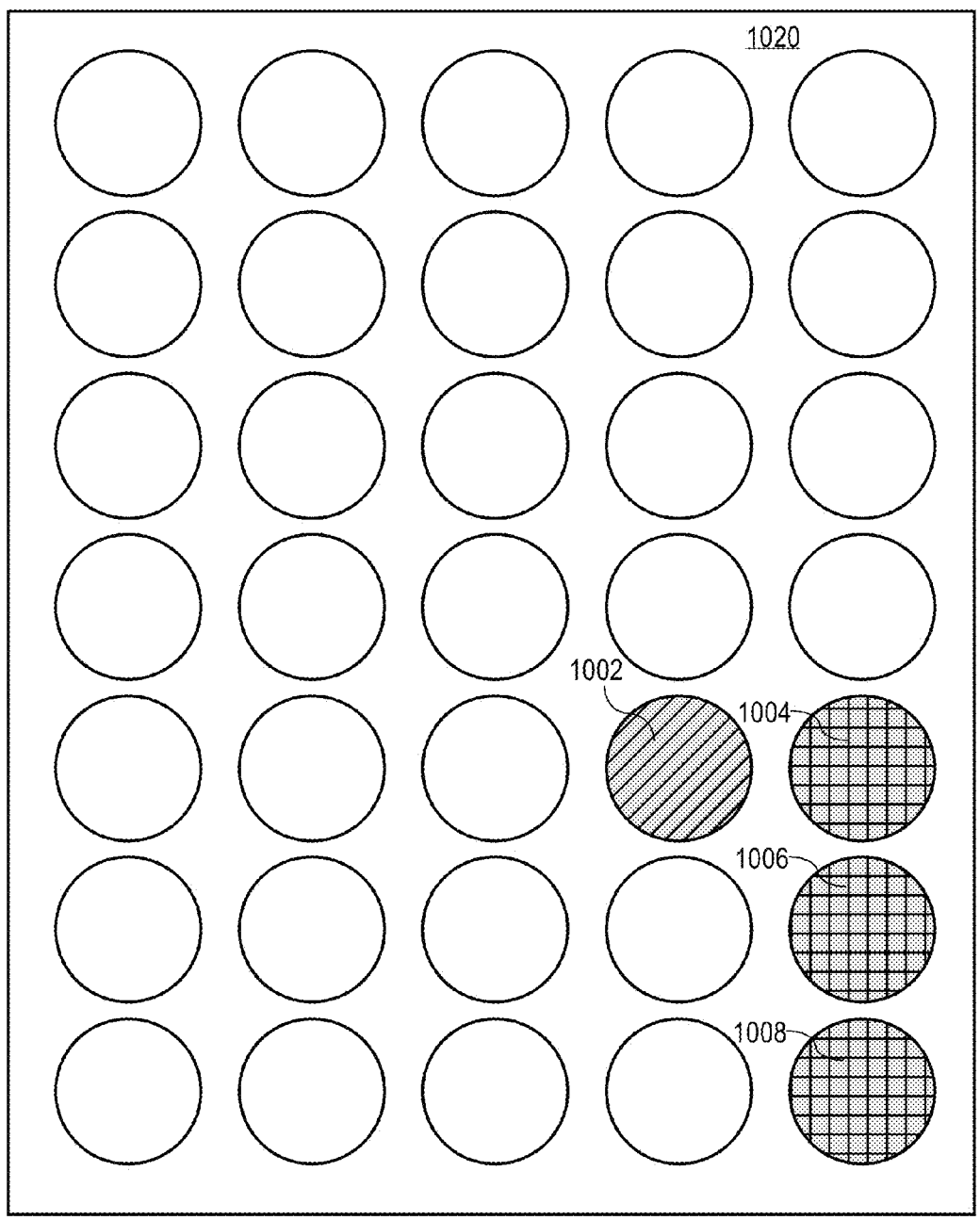

To illustrate a second configuration of items displayed in GUI 1000, GUI 1020 of FIG. 10B depicts the plurality of items from GUI 1000, where the plurality of items are arranged such that item 1002 is laterally contingent to item 1004, and diagonally contingent to item 1006. The arrangement of GUI 1020 allows the user to more easily co-select items 1002-1008 (i.e., in a single swipe) because of items 1002-1008 are contiguous in GUI 1020.

At times, historical usage data indicates that the items displayed in a GUI should be adjusted, such as consolidating the display of items in a GUI. For example, according to an embodiment, GUI configuration service 124 determines, based on historical usage information, that a particular user (or group of similar users) co-selects two or more particular items from a particular GUI every time the one or more users select the two or more particular items. Such information indicates that each of the two or more particular items do not have functionality independent from the other items of the two or more particular items for those users. In response to making such a determination, GUI configuration service 124 generates an arrangement for the particular GUI in which the two or more particular items are represented by a single item, which is referred to herein as a joint item.

Figure 10C:
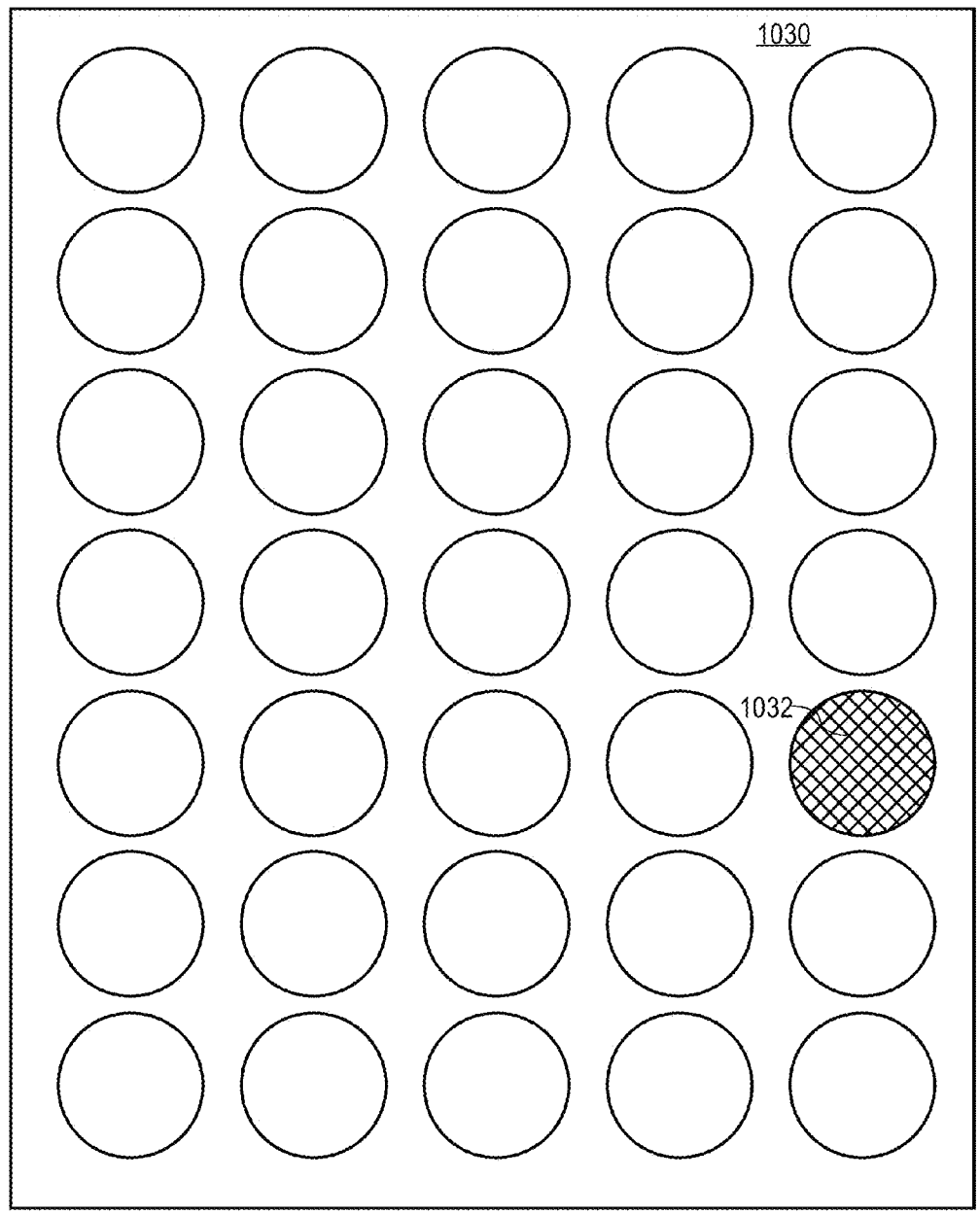

For example, based on usage information from GUI 1000, GUI configuration service 124 determines that items 1002 and 1004 do not have functionality independent from each other for at least a particular user. As such, GUI configuration service 124 generates an arrangement for the plurality of items in GUI 1000 (as depicted in GUI 1030 of FIG. 10C) in which items 1002 and 1004 are represented by a joint item 1032. According to an embodiment, items 1002 and 1004 are not represented independently in GUI 1030 (i.e., with individual item representations) when the items are represented by joint item 1032. According to another embodiment, items 1002 and 1004 are also represented independently in GUI 1030 in addition to the representation of joint item 1032.

At times, historical usage data indicates that an item that is normally displayed in response to selection of a particular item in a GUI should be displayed on a higher-level GUI. To illustrate, GUI configuration service 124 displays a particular item in a particular GUI context (e.g., a particular GUI such as a dashboard GUI). When users select the particular item, GUI configuration service 124 then causes a set of three sub-items to be displayed based on the user's selection of the particular item. GUI configuration service 124 determines from historical usage data that, when a particular group of similar users, or a particular user, selects the particular item to gain access to the three sub-items, users in the particular group of similar users (or the particular user) only select a particular sub-item of the three sub-items. In response to this determination, GUI configuration service 124 replaces the particular item in the original GUI context with the particular sub-item when the GUI is presented to the particular user or group of users. Such an adjustment streamlines the users' access to the particular popular sub-item.

In an embodiment, the target client of step 908 is client device 110, from which the usage information was received in step 904. In this embodiment, historical usage information from a particular user is used to configure GUIs for the particular user. According to a further embodiment, historical usage information from users other than the particular user is not used to arrange GUIs for the particular user.

According to another embodiment in which information from particular users is used to configure GUIs for other similar users, the target client is client device 150, which is distinct from the device that sent the usage information in step 904. In this embodiment, instrumentation service 126 has determined that the user of client device 150 is similar to the user of client device 110.

Intelligent Suggestion of Items for User Selection

According to embodiments, historical usage information is also used to identify common combinations of selected items. In embodiments, multi-selection client 112 highlights, in a GUI, items that are commonly co-selected (i.e., common combinations of items) as an aid to users of the GUI.

Figure 11:
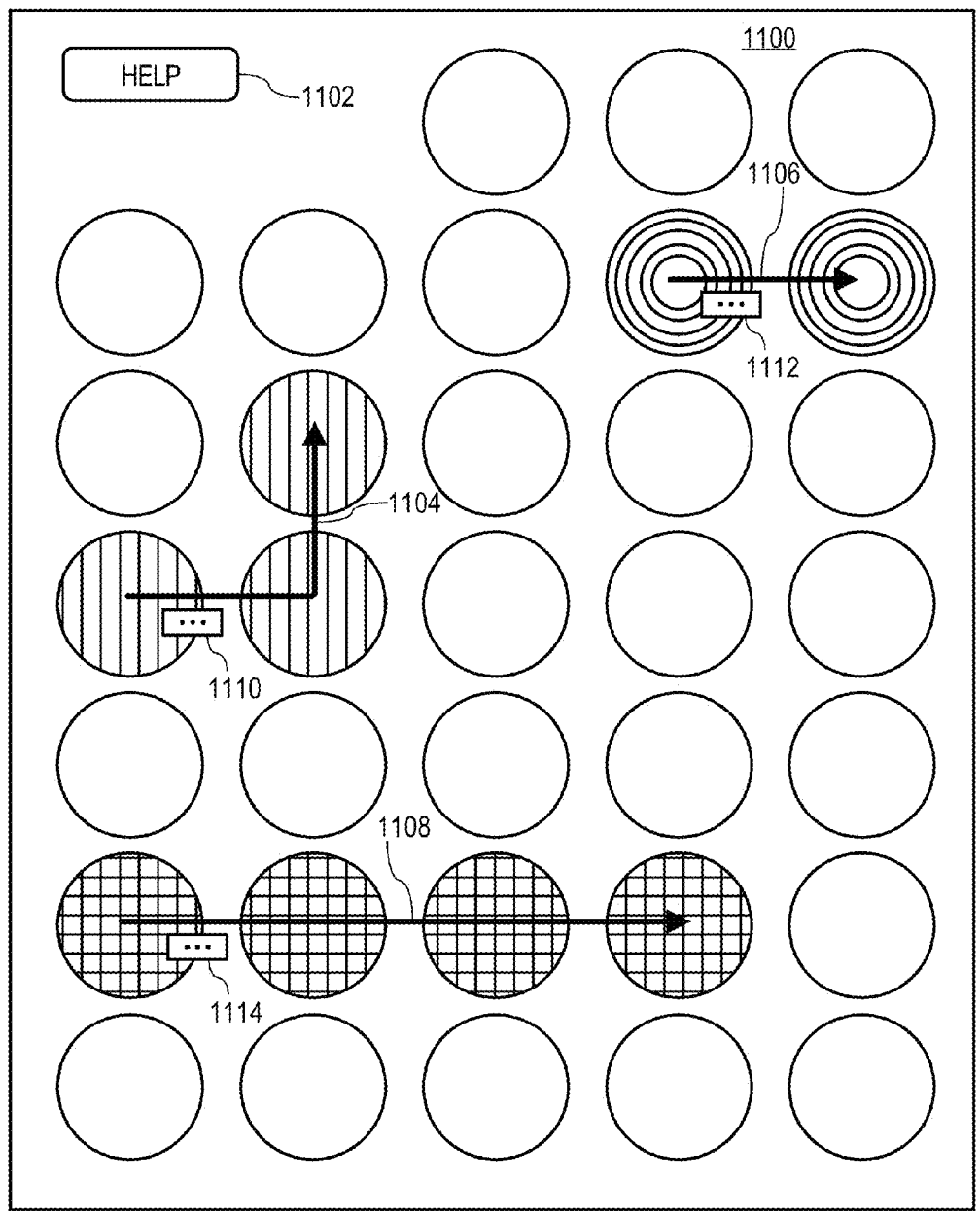
FIG. 11 depicts a GUI that provides guidance by highlighting commonly co-selected items in the GUI in response to the user activating a GUI control.

When interacting with a multi-selectable GUI, a user may require some guidance about items that are useful when co-selected. According to an embodiment, multi-selection client 112 provides such guidance by highlighting commonly co-selected items in a GUI in response to the user activating a GUI control, such as a help button. To illustrate, GUI 1100 of FIG. 11 depicts a help button 1102. In response to detecting activation of help button 1102, multi-selection client 112 sends information about the request to GUI configuration service 124, which requests information about commonly co-selected items in GUI 1100 from instrumentation service 126.

Instrumentation service 126 identifies three sets of commonly co-selected items from GUI 1100, and returns information indicating the identified sets of commonly co-selected items to multi-selection client 112 (i.e., via GUI configuration service 124). Multi-selection client 112 highlights, in GUI 1100, each set of commonly co-selected items, i.e., the set of items that swipe path 1106 intersects, the set of items that swipe path 1108 intersects, and the set of items that swipe path 1104 intersects. As depicted in GUI 1100, each set of commonly co-selected items is highlighted with a distinct visual highlight, which may be patterns or colors of the items, distinct arrows showing potential swipe paths to select the items (which may also have distinct features from other arrows in the display), etc.

According to an embodiment, the items in GUI 1100 are action items, and multi-selection client 112 provides information regarding functions that the visually highlighted sets of items perform, e.g., by default. Such information may be displayed in response to detecting activation of help button 1102 (i.e., in connection with displaying the visual highlights of the sets of commonly co-selected items), when the user rolls over one of the highlighted items, activates or rolls over a control (such as one of more info buttons 1110-1114 that are included in the embodiment illustrated by GUI 1100), etc.

Multi-selection client 112 may also provide to a user suggestions regarding items that are commonly co-selected with items that a user is currently selecting, or has selected. According to an embodiment, GUI configuration service 124 detects that the user has selected one or more particular items in a GUI, using any kind of interaction event described herein (e.g., swipe-style interactions, point-style interactions, etc.). In response to detecting selection of the one or more particular items, GUI configuration service 124 identifies one or more sets of items, displayed in the GUI, that users similar to the user of the GUI co-select, where the one or more sets of items each include all of the one or more items that the user has selected.

Figure 12A:
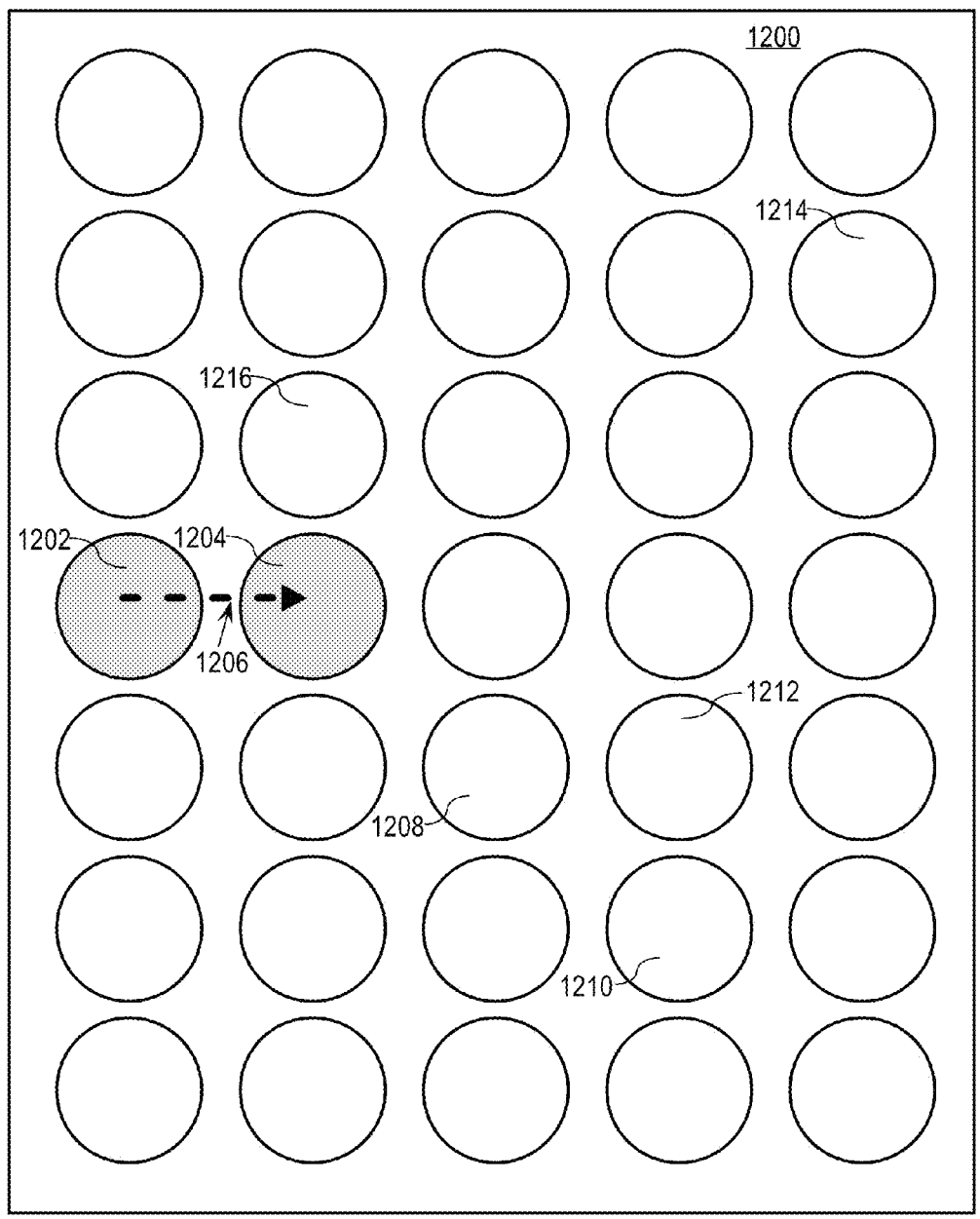
FIGS. 12A-C depict a GUI that provides guidance by highlighting commonly co-selected items in the GUI in response to the user selecting items in the GUI.

To illustrate, multi-selection client 112 detects that a particular user performs swipe 1206 in GUI 1200 of FIG. 12A, where swipe 1206 selects items 1202 and 1204 displayed in GUI 1200. Multi-selection client 112 sends information, to GUI configuration service 124, indicating that the user has co-selected items 1202 and 1204. GUI configuration service 124 causes instrumentation service 126 to search database 140 for historical usage data indicating items that have been previously co-selected with items 1202 and 1204, which usage data was recorded for users that are similar to the particular user (and/or for the particular user).

GUI configuration service 124 may determine that all of the identified combinations are common, or may determine that only those combinations that satisfy certain criteria are common. The certain criteria may be one or more of: the items have been co-selected a certain number of times, the items have been co-selected within a certain amount of time before the present search, suggestions to users suggesting selection of the combination of items have been indicated as helpful or have been used at least a certain number of times, etc.

In the example of GUI 1200, GUI configuration service 124 determines that the following combinations of items that include both 1202 and 1204 were commonly co-selected:
1202, 1204, 1208, and 1210;
1202, 1204, 1208, and 1212;
1202, 1204, and 1214; and
1202, 1204, and 1216.

GUI configuration service 124 causes multi-selection client 112 to visually highlight the commonly co-selected combinations of items prior to detecting completion of the user's interaction with GUI 1200. The different paths created by each combination of items, respectively, are highlighted with distinct visual highlights so that the user can visually identify which items are commonly co-selected.

Figure 12B:
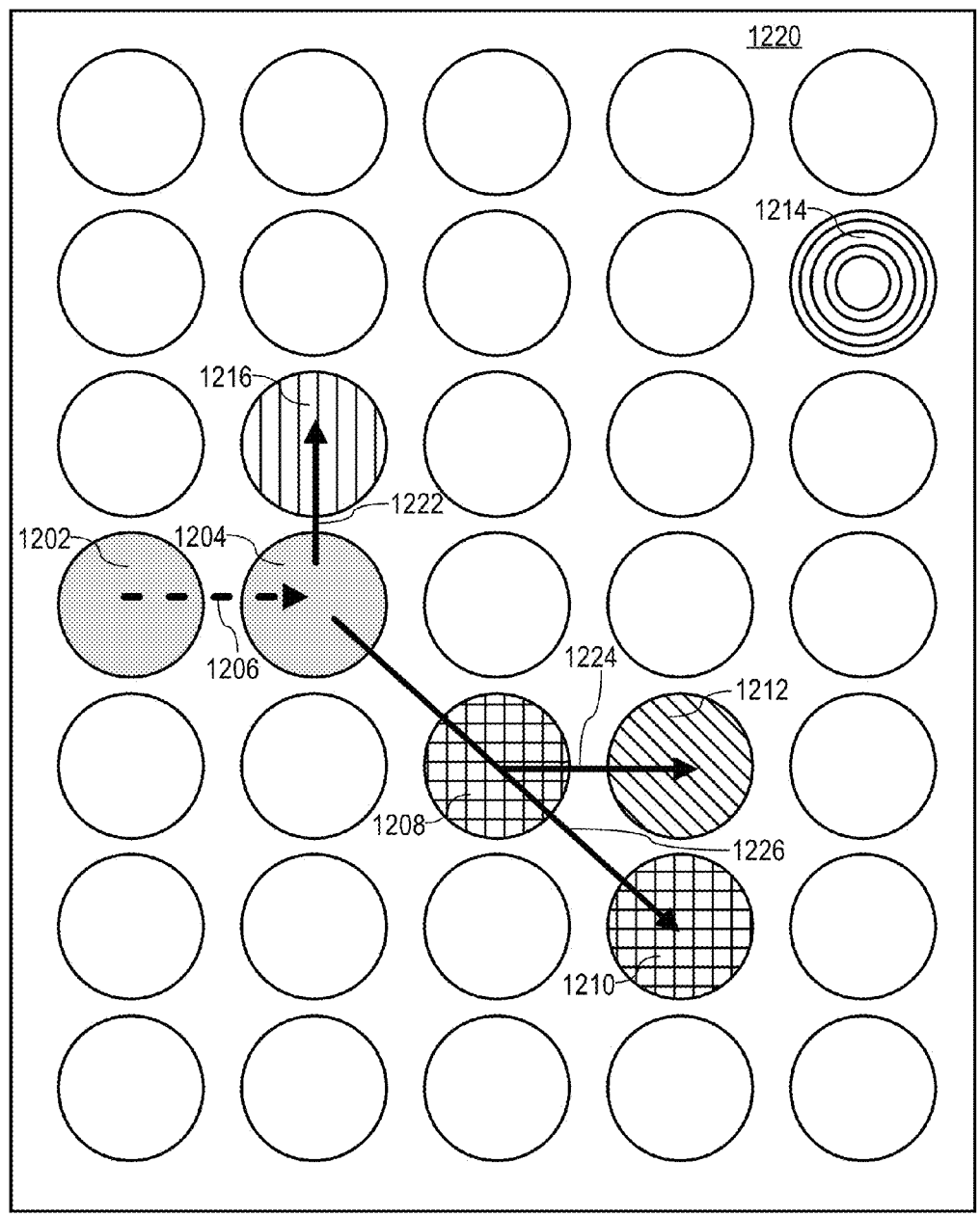

To illustrate, in GUI 1220 of FIG. 12B, multi-selection client 112 has highlighted item 1216 with a distinct visual highlight from items 1208 and 1210, etc. According to an embodiment, because item 1208 is included in multiple sets of commonly co-selected items, multi-selection client 112 assigns it a visual highlight from a particular set of co-selected items in which item 1208 is included. As such, item 1212 is assigned a different visual highlight than item 1208, even though the two items are also included in at least one set of commonly co-selected items together. According to the embodiment of GUI 1220, illustrations of suggested swipe paths 1222, 1224, and 1226 may be used to help the user further visually identify suggestions of items to co-select with the currently selected items 1202 and 1204.

Figure 12C:
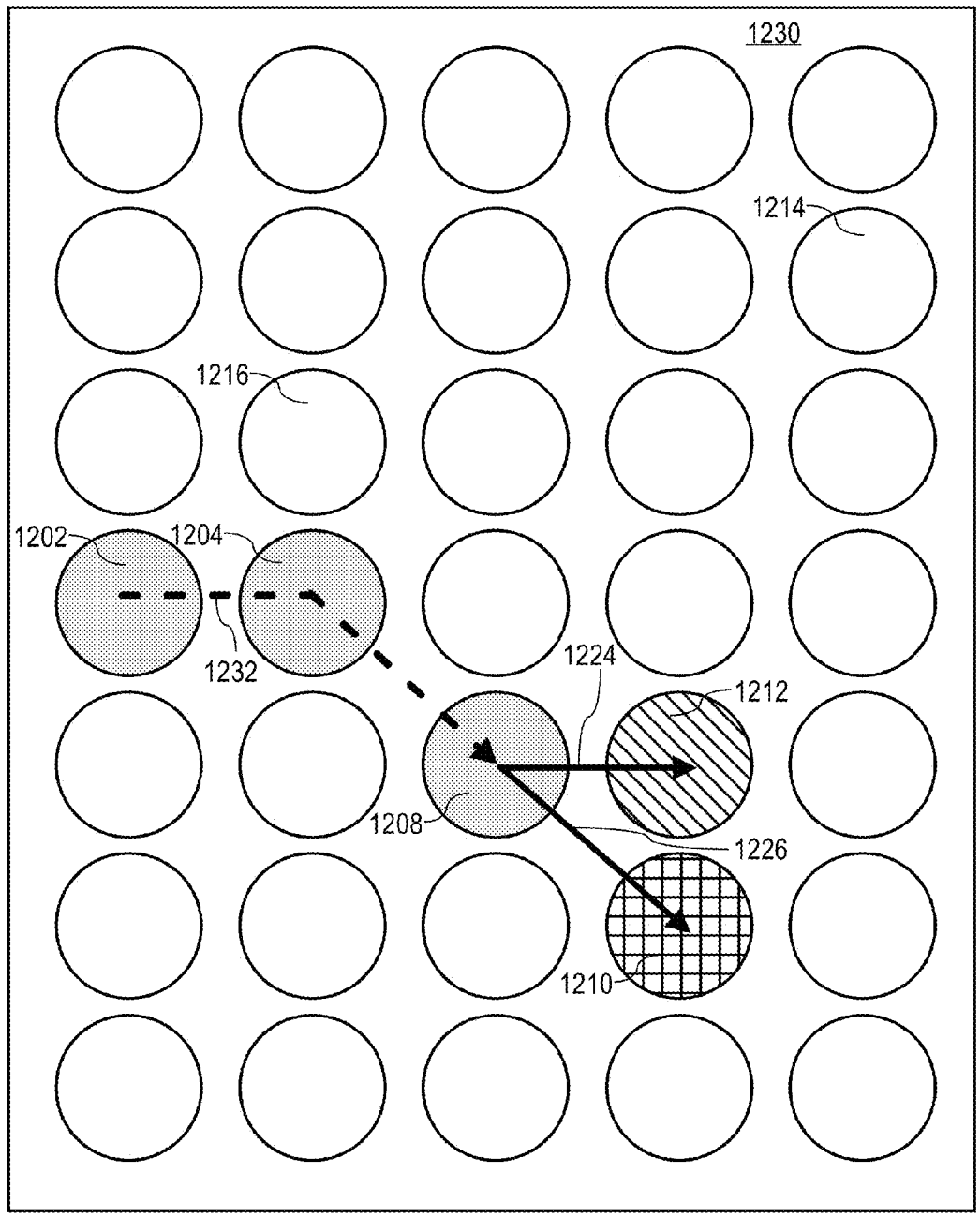

According to an embodiment, multi-selection client 112 modifies the visual highlights when the user co-selects a new item with the previously selected items. To illustrate in the context of GUI 1220, the user further selects item 1208 with items 1202 and 1204, as depicted in GUI 1230 of FIG. 12C, i.e., by continuing to swipe via the path of swipe 1232. In response to detecting co-selection of item 1208 with items 1202 and 1204, multi-selection client 112 causes visual highlights to be displayed only for those items that are in sets of commonly co-selected items with all of items 1202, 1204, and 1208. In the example of GUI 1230, GUI configuration service 124 identifies the following sets of items as commonly co-selected (which include the currently selected items): 1202, 1204, 1208, and 1212; and 1202, 1204, 1208, and 1210. GUI configuration service 124 sends this information to multi-selection client 112. Multi-selection client 112 causes items 1212 and 1210 to be visually highlighted with distinct highlights, respectively, since those two items are the items, in the sets of commonly co-selected items, that are not yet selected. In the embodiment of GUI 1230, multi-selection client 112 also displays suggested swipe paths 1224 and 1226.

According to an embodiment, multi-selection client 112 visually highlights commonly co-selected combinations of items while the user is selecting items, e.g., while the user is performing an interaction event. For example, multi-selection client 112 highlights the paths as shown in GUI 1220 of FIG. 12B while the user swipes over item 1204.

According to an embodiment, multi-selection client 112 visually highlights commonly co-selected combinations of items after the user has finished selecting items, e.g., once the user has terminated an interaction event. For example, multi-selection client 112 highlights the paths as shown in GUI 1220 of FIG. 12B once the user has completed swipe 1206.

According to an embodiment, multi-selection client 112 uses historical usage data from similar users to provide recommendations and GUI configurations for a particular user where there is insufficient usage data from the particular user on which to base such recommendations and GUI configurations. As the particular user uses the system, and more usage data is gathered for the particular user, multi-selection client 112 uses information from the particular user to generate item highlights (i.e., item suggestions) and GUI configurations, etc., for the particular user.

According to an embodiment, multi-selection client 112 deactivates items, in a GUI, that are not included in combinations of items mapped to actions with the items that the user has currently selected. In other words, multi-selection client 112 prevents the user from selecting combinations of items that do not have actions mapped thereto.

According to an embodiment, action service 122 starts processing data (e.g., in information items 142) to respond to a user request for one or more actions based on one or more items selected by the user before multi-selection client 112 has determined that the user has completed the user's interaction with the GUI.

According to embodiments, before the user has completed item selection, action service 122 identifies a combination of items that the user is likely targeting based on items that the user has currently selected. Action service 122 identifies one or more actions mapped to the identified combination of items and initiates processing of information items 142 according to the one or more mapped actions without regard to whether the user has completed the user's interaction with the GUI. If, when the user completes the interaction, action service 122 has anticipated the correct combination of items, then action service 122 does not halt the processing of information items 142 and completes the one or more actions.

If, when the user completes the interaction with the GUI, action service 122 has not anticipated the correct combination of items, then action service 122 determines whether one or more of the actions being performed on the underlying data set as an anticipated response to the user's interaction are mapped to (or are useful for actions mapped to) the combination that the user has selected. If so, action service 122 does not halt processing of the underlying data set for those actions that are mapped to or useful for processing the selected combination of items. Action service 122 further causes any unperformed default actions to be performed on the underlying data set.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
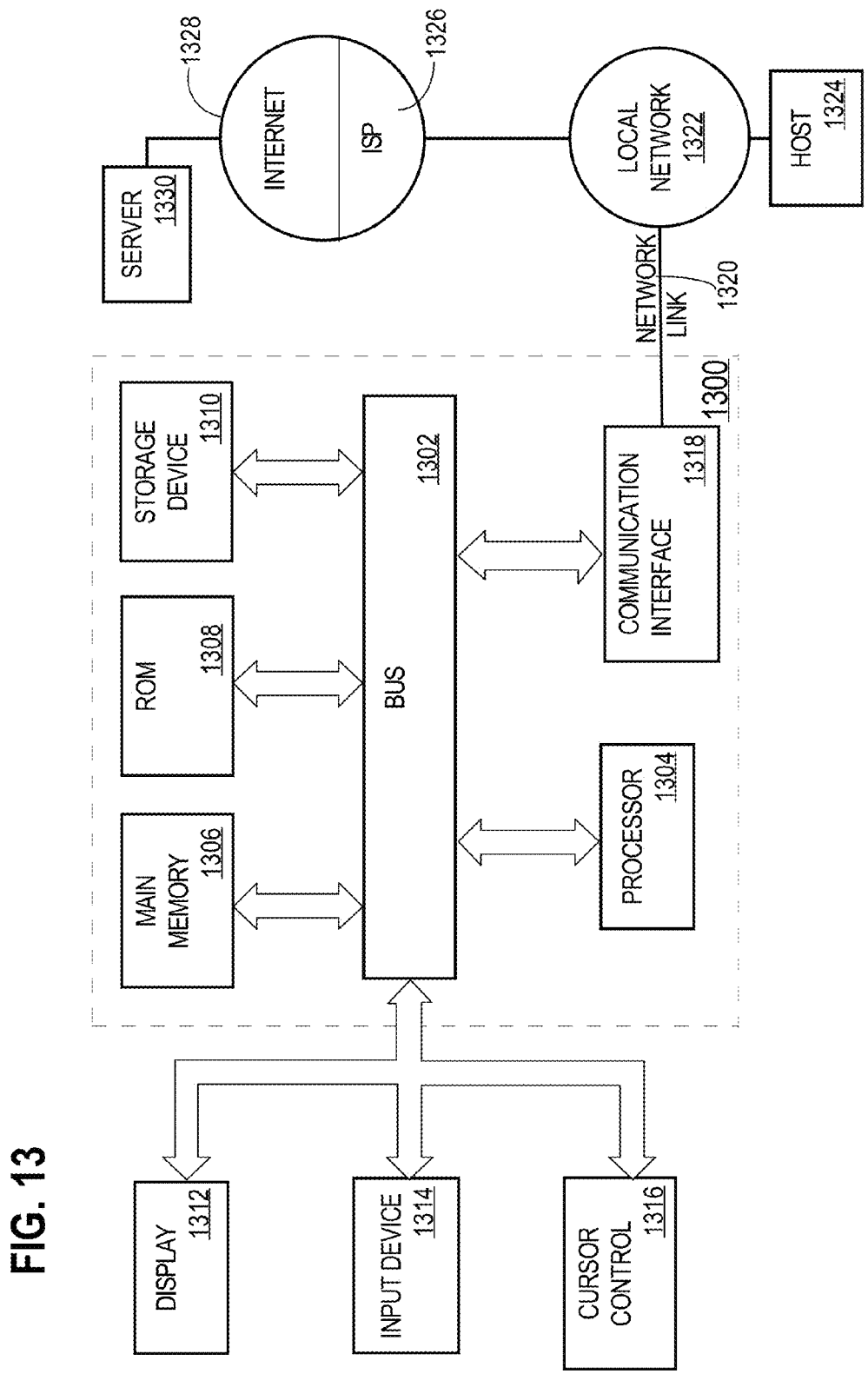
FIG. 13 is a block diagram of a computer system on which embodiments may be implemented.

For example, FIG. 13 is a block diagram that illustrates a computer system 1300 upon which an embodiment of the invention may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A computer-executed method comprising:
   maintaining a database of information items;
   a computing device displaying a plurality of GUI items in a graphical user interface;
   storing a plurality of mappings, wherein each mapping of the plurality of mappings maps a distinct combination of GUI items, from the plurality of GUI items, to a corresponding set of one or more actions;
   the computing device detecting an interaction with the graphical user interface that co-selects two or more GUI items of the plurality of GUI items;
   wherein a particular GUI item, of the two or more GUI items, represents a particular characteristic that is shared by multiple information items in the database; and
   in response to detecting the interaction that co-selects two or more GUI items of the plurality of GUI items, automatically, without further user interaction, performing the steps of:
     based on the plurality of mappings, identifying a particular set of one or more actions that is mapped to a combination of the two or more GUI items; and
     identifying a particular set of information items, in the database of information items, that have the particular characteristic;
     performing at least one action in the particular set of one or more actions relative to the particular set of information items.

2. The computer-executed method of claim 1, wherein the interaction is a swipe-style interaction, the method further comprising:
   while the swipe-style interaction is being detected:
     identifying one or more GUI items currently selected by the swipe-style interaction;
     identifying one or more combinations of GUI items, from historical usage data, that include the one or more GUI items currently selected by the swipe-style interaction;

wherein at least a particular combination of GUI items, of the one or more combinations of GUI items, includes at least one GUI item, of the plurality of GUI items, that is not currently selected by the swipe-style interaction; and visually highlighting the at least one GUI item, of the plurality of GUI items, that is not currently selected by the swipe-style interaction.

3. The computer-executed method of claim 1, further comprising:

before detecting the interaction:

identifying, from historical usage data, one or more common combinations of GUI items of the plurality of GUI items; and highlighting GUI items in the one or more common combinations of GUI items in the graphical user interface;

wherein the one or more common combinations of GUI items each include two or more GUI items of the plurality of GUI items.

4. The computer-executed method of claim 3, wherein:

the one or more common combinations of GUI items comprises at least a first combination of GUI items and a second combination of GUI items; and a first visual highlight that highlights the first combination of GUI items is visually distinct from a second visual highlight that highlights the second combination of GUI items.

5. The computer-executed method of claim 1, wherein the at least one action of the particular set of one or more actions is performed after detecting completion of the interaction with the graphical user interface.

6. The computer-executed method of claim 5, wherein detecting completion of the interaction with the graphical user interface comprises detecting cessation of one or more interactions events that enact the interaction.

7. The computer-executed method of claim 5, wherein:

the interaction with the graphical user interface comprises two or more interaction events;

each interaction event, of the two or more interaction events, targets at least one GUI item of the plurality of GUI items;

a particular interaction event, of the two or more interaction events, targets at least two GUI items of the plurality of GUI items; and detecting completion of the interaction comprises detecting activation of a particular control in the graphical user interface.

8. The computer-executed method of claim 7, further comprising:

prior to detecting an interaction event that enacts the interaction, detecting a first activation of the particular control in the graphical user interface;

wherein detecting completion of the interaction comprises detecting a second activation of the particular control in the graphical user interface.

9. The computer-executed method of claim 5, wherein:

the interaction is enacted by at least one interaction event; and detecting completion of the interaction with the graphical user interface comprises detecting cessation, of the at least one interaction event, that is longer than a predetermined amount of time.

10. The computer-executed method of claim 9, further comprising, prior to detecting completion of the interaction, receiving information indicating the predetermined amount of time from a user.

11. The computer-executed method of claim 1, further comprising detecting the interaction with the graphical user interface via one or more of:

a touch interface;
a camera;
a motion detector;
a keyboard interface;
a voice recognizer; and
a mouse interface.

12. A computer-executed method comprising:

maintaining a database of information items, wherein each information item in the database is associated with metadata;

a computing device displaying a plurality of selectable GUI items in a graphical user interface (GUI);

wherein each selectable GUI item of the plurality of selectable GUI items represents one or more selection criteria;

the computing device detecting an interaction with the GUI that co-selects two or more selectable GUI items of the plurality of selectable GUI items; and in response to detecting the interaction with the GUI that co-selects two or more selectable GUI items of the plurality of selectable GUI items, performing the steps of:

selecting a first set of information items, wherein the first set of information items includes only information items in the database that satisfy the selection criteria represented by the two or more co-selected GUI items;

determining whether a drill down GUI control in the GUI is selected;

in response to determining that the drill down GUI control in the GUI is selected, performing:

forming a plurality of groups from the first set of information items;

wherein, for each group of the plurality of groups, all information items in the group have at least one metadata value in common; and displaying, in the GUI, a plurality of sub-category GUI items without displaying the first set of information items;

wherein each sub-category GUI item, of the plurality of sub-category GUI items, represents a corresponding group of the plurality of groups.

13. The computer-executed method of claim 12, wherein the step of determining which information items in the database satisfy the selection criteria represented by at least one of the two or more co-selected GUI items is performed at least partially while the interaction with the GUI is being detected.

14. The computer-executed method of claim 12, further comprising:

detecting a second interaction with the GUI that selects one or more sub-category GUI items of the plurality of sub-category GUI items; and in response to detecting the second interaction with the GUI:

selecting a second set of information items from among the information items in the first set of information items, wherein the second set of information items includes only information items that have the metadata value common to each of the one or more sub-category GUI items;

determining whether the drill down GUI control in the GUI is selected; and in response to determining that the drill down GUI control in the GUI is not selected, displaying, in the GUI, one or more information items from the second set of information items.

15. The computer-executed method of claim 12, further comprising:
   the computing device detecting a second interaction with the GUI that co-selects two or more of the plurality of sub-category GUI items;
   in response to detecting the interaction with the GUI that co-selects two or more of the plurality of sub-category GUI items:
      identifying the nature of particular information items, from the first set of information items, that are in groups that correspond to the co-selected two or more sub-category GUI items;
      based, at least in part, on the nature of the particular information items, identifying a plurality of action items that are applicable to the particular information items; and
      displaying a plurality of action GUI items, wherein each action GUI item, of the plurality of action GUI items, corresponds to a respective action item of the plurality of action items;
   the computing device detecting a third interaction with the GUI that selects one or more of the plurality of action GUI items; and
   in response to detecting the third interaction with the GUI that selects one or more of the plurality of action GUI items, applying one or more actions, which correspond to the one or more selected action GUI items, to the particular information items.

16. The computer-executed method of claim 15, wherein the third interaction with the GUI co-selects two or more of the plurality of action GUI items.

17. One or more non-transitory computer-readable media storing one or more sequences of instructions which, when executed by one or more processors, cause performance of:
   maintaining a database of information items;
   a computing device displaying a plurality of GUI items in a graphical user interface;
   storing a plurality of mappings, wherein each mapping of the plurality of mappings maps a distinct combination of GUI items, from the plurality of GUI items, to a corresponding set of one or more actions;
   the computing device detecting an interaction with the graphical user interface that co-selects two or more GUI items of the plurality of GUI items;
   wherein a particular GUI item, of the two or more GUI items, represents a particular characteristic that is shared by multiple information items in the database; and
   in response to detecting the interaction that co-selects two or more GUI items of the plurality of GUI items, automatically, without further user interaction, performing the steps of:
      based on the plurality of mappings, identifying a particular set of one or more actions that is mapped to a combination of the two or more GUI items; and
      identifying a particular set of information items, in the database of information items, that have the particular characteristic;
   performing at least one action in the particular set of one or more actions relative to the particular set of information items.

18. The one or more non-transitory computer-readable media of claim 17, wherein the interaction is a swipe-style interaction, the one or more sequences of instructions further comprise instructions for:
   while the swipe-style interaction is being detected:
      identifying one or more GUI items currently selected by the swipe-style interaction;
      identifying one or more combinations of GUI items, from historical usage data, that include the one or more GUI items currently selected by the swipe-style interaction;
      wherein at least a particular combination of GUI items, of the one or more combinations of GUI items, includes at least one GUI item, of the plurality of GUI items, that is not currently selected by the swipe-style interaction; and
      visually highlighting the at least one GUI item, of the plurality of GUI items, that is not currently selected by the swipe-style interaction.

19. The one or more non-transitory computer-readable media of claim 17, further comprising instructions for:
   before detecting the interaction:
      identifying, from historical usage data, one or more common combinations of GUI items of the plurality of GUI items; and
      highlighting GUI items in the one or more common combinations of GUI items in the graphical user interface;
      wherein the one or more common combinations of GUI items each include two or more GUI items of the plurality of GUI items.

20. The one or more non-transitory computer-readable media of claim 19, wherein:
   the one or more common combinations of GUI items comprises at least a first combination of GUI items and a second combination of GUI items; and
   a first visual highlight that highlights the first combination of GUI items is visually distinct from a second visual highlight that highlights the second combination of GUI items.

21. The one or more non-transitory computer-readable media of claim 17, further comprising instructions for detecting the interaction with the graphical user interface via one or more of:
   a touch interface;
   a camera;
   a motion detector;
   a keyboard interface;
   a voice recognizer; and
   a mouse interface.

22. The one or more non-transitory computer-readable media of claim 17, wherein the at least one action of the particular set of one or more actions is performed after detecting completion of the interaction with the graphical user interface.

23. The one or more non-transitory computer-readable media of claim 22, wherein detecting completion of the interaction with the graphical user interface comprises detecting cessation of one or more interactions events that enact the interaction.

24. The one or more non-transitory computer-readable media of claim 22, wherein:
   the interaction with the graphical user interface comprises two or more interaction events;
   each interaction event, of the two or more interaction events, targets at least one GUI item of the plurality of GUI items;

a particular interaction event, of the two or more interaction events, targets at least two GUI items of the plurality of GUI items; and detecting completion of the interaction comprises detecting activation of a particular control in the graphical user interface.

25. The one or more non-transitory computer-readable media of claim 24, wherein the instructions further comprise instructions which, when executed by one or more processors, cause performance of:

prior to detecting an interaction event that enacts the interaction, detecting a first activation of the particular control in the graphical user interface;

wherein detecting completion of the interaction comprises detecting a second activation of the particular control in the graphical user interface.

26. The one or more non-transitory computer-readable media of claim 22, wherein:

the interaction is enacted by at least one interaction event; and detecting completion of the interaction with the graphical user interface comprises detecting cessation, of the at least one interaction event, that is longer than a predetermined amount of time.

27. The one or more non-transitory computer-readable media of claim 26, wherein the instructions further comprise instructions which, when executed by one or more processors, cause performance of, prior to detecting completion of the interaction, receiving information indicating the predetermined amount of time from a user.

28. One or more non-transitory computer-readable media storing instructions which, when executed by one or more processors, cause performance of:

maintaining a database of information items, wherein each information item in the database is associated with metadata;

a computing device displaying a plurality of selectable GUI items in a graphical user interface (GUI);

wherein each selectable GUI item of the plurality of selectable GUI items represents one or more selection criteria;

the computing device detecting an interaction with the GUI that co-selects two or more selectable GUI items of the plurality of selectable GUI items; and in response to detecting the interaction with the GUI that co-selects two or more selectable GUI items of the plurality of selectable GUI items, performing the steps of:

selecting a first set of information items, wherein the first set of information items includes only information items in the database that satisfy the selection criteria represented by the two or more co-selected GUI items;

determining whether a drill down GUI control in the GUI is selected;

in response to determining that the drill down GUI control in the GUI is selected, performing:

forming a plurality of groups from the first set of information items;

wherein, for each group of the plurality of groups, all information items in the group have at least one metadata value in common; and displaying, in the GUI, a plurality of sub-category GUI items without displaying the first set of information items;

wherein each sub-category GUI item, of the plurality of sub-category GUI items, represents a corresponding group of the plurality of groups.

29. The one or more non-transitory computer-readable media of claim 28, wherein determining which information items in the database satisfy the selection criteria represented by at least one of the two or more co-selected GUI items is performed at least partially while the interaction with the GUI is being detected.

30. The one or more non-transitory computer-readable media of claim 28, wherein the instructions further comprise instructions which, when executed by one or more processors, cause performance of:

detecting a second interaction with the GUI that selects one or more sub-category GUI items of the plurality of sub-category GUI items; and in response to detecting the second interaction with the GUI:

selecting a second set of information items from among the information items in the first set of information items, wherein the second set of information items includes only information items that have the metadata value common to each of the one or more sub-category GUI items;

determining whether the drill down GUI control in the GUI is selected; and in response to determining that the drill down GUI control in the GUI is not selected, displaying, in the GUI, one or more information items from the second set of information items.

31. The one or more non-transitory computer-readable media of claim 28, wherein the instructions further comprise instructions which, when executed by one or more processors, cause performance of:

the computing device detecting a second interaction with the GUI that co-selects two or more of the plurality of sub-category GUI items;

in response to detecting the interaction with the GUI that co-selects two or more of the plurality of sub-category GUI items:

identifying the nature of particular information items, from the first set of information items, that are in groups that correspond to the co-selected two or more sub-category GUI items;

based, at least in part, on the nature of the particular information items, identifying a plurality of action items that are applicable to the particular information items; and displaying a plurality of action GUI items, wherein each action GUI item, of the plurality of action GUI items, corresponds to a respective action item of the plurality of action items;

the computing device detecting a third interaction with the GUI that selects one or more of the plurality of action GUI items; and in response to detecting the third interaction with the GUI that selects one or more of the plurality of action GUI items, applying one or more actions, which correspond to the one or more selected action GUI items, to the particular information items.

32. The one or more non-transitory computer-readable media of claim 31, wherein the third interaction with the GUI co-selects two or more of the plurality of action GUI items.

* * * * *